United States Patent
Pyne et al.

(10) Patent No.: US 12,533,497 B2
(45) Date of Patent: *Jan. 27, 2026

(54) DETACHABLE BALLOON EMBOLIZATION DEVICE AND METHODS

(71) Applicant: Devaraj Pyne, Pittsford, NY (US)

(72) Inventors: Devaraj Pyne, Pittsford, NY (US); Nicolo Garbin, Houston, TX (US); Jordan Mykleby, Nashville, TN (US); Jay Hope, Nashville, TN (US)

(73) Assignee: Devaraj Pyne, Pittsford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,418

(22) Filed: Mar. 25, 2023

(65) Prior Publication Data

US 2023/0355935 A1    Nov. 9, 2023

Related U.S. Application Data

(62) Division of application No. 17/666,199, filed on Feb. 7, 2022.

(Continued)

(51) Int. Cl.
  *A61M 25/00* (2006.01)
  *A61M 25/10* (2013.01)

(52) U.S. Cl.
  CPC ...... *A61M 25/104* (2013.01); *A61M 25/0021* (2013.01); *A61M 25/10185* (2013.11);
  (Continued)

(58) Field of Classification Search
  CPC .... A61M 2025/1031; A61M 2025/105; A61M 25/10184; A61M 2025/1013;
  (Continued)

(56) References Cited

U.S. PATENT DOCUMENTS 3,402,718 A * 9/1968 Doherty .............. A61M 16/045
  604/920
4,517,979 A * 5/1985 Pecenka ........... A61B 17/12136
  604/97.02

(Continued)

FOREIGN PATENT DOCUMENTS

EP    2793988 B1    9/2018

OTHER PUBLICATIONS

International Search Report and Written Opinion issued in Application PCT/US2022/015484 on May 30, 2022.

(Continued)

*Primary Examiner* — Shaun L David
*Assistant Examiner* — Mitchell Brian Hoag
(74) *Attorney, Agent, or Firm* — Holland & Knight LLP; Matthew C. Cox; Forrest S. Tinnin

(57) ABSTRACT

A balloon embolization apparatus, system and method include a detachable balloon device mounted to the distal end of a catheter or microcatheter. The balloon device includes an elongated cannula having first and second axial lumens defined in the cannula, one lumen which allows for travel over a wire, an inflatable balloon disposed on the cannula, and a valve sleeve disposed between the balloon and the cannula. An inflation port on the cannula allows fluid to be introduced to the balloon via a channel in the catheter. The valve sleeve includes a vent offset from the inflation port in the cannula. The valve sleeve allows the introduced fluid to inflate the balloon, but prevents the fluid from escaping, thereby forming a check valve. Once inflated, the catheter is detached from the balloon apparatus. When the catheter is withdrawn, the balloon remains in place to allow for embolization.

20 Claims, 22 Drawing Sheets

Related U.S. Application Data

(60) Provisional application No. 63/146,166, filed on Feb. 5, 2021.

(52) U.S. Cl.
CPC ............... *A61M 2025/0042* (2013.01); *A61M 2025/1054* (2013.01); *A61M 2025/1056* (2013.01); *A61M 2025/1063* (2013.01); *A61M 2025/1079* (2013.01)

(58) Field of Classification Search
CPC ...... A61M 25/1018; A61M 2025/0003; A61M 2025/09133; A61M 2025/1075; A61M 25/0045; A61M 2025/0046; A61M 2025/0057; A61M 2025/0056; A61M 25/0026; A61M 25/0071; A61M 2025/091; A61M 25/10181; A61M 25/10185; A61M 25/104; A61M 2025/1043; A61M 2025/1045; A61M 2025/1056; A61M 2025/1059; A61B 17/12022; A61B 17/1204; A61B 17/12045; A61B 17/12109; A61B 17/12113; A61B 17/12118; A61B 17/12131; A61B 17/12136

See application file for complete search history.

(56) References Cited

U.S. PATENT DOCUMENTS

| | | | | |
|---|---|---|---|---|
| 5,032,112 | A * | 7/1991 | Fairchild | A61M 5/16831 604/80 |
| 5,032,113 | A | 7/1991 | Burns | |
| 5,222,970 | A | 6/1993 | Reeves | |
| 5,250,025 | A | 10/1993 | Sosnowski et al. | |
| 5,265,622 | A | 11/1993 | Barbere | |
| 5,490,839 | A * | 2/1996 | Wang | A61M 25/1038 604/103 |
| 5,921,965 | A | 7/1999 | Blei et al. | |
| 6,379,329 | B1 | 4/2002 | Naglreiter et al. | |
| 8,900,304 | B1 * | 12/2014 | Alobaid | A61B 17/7097 606/92 |
| 9,028,401 | B1 | 5/2015 | Bacich et al. | |
| 10,668,258 | B1 * | 6/2020 | Calhoun | A61M 29/02 |
| 2002/0082548 | A1 * | 6/2002 | Sanchez | A61M 25/0026 604/96.01 |
| 2002/0103473 | A1 | 8/2002 | Roychowdhury et al. | |
| 2002/0133217 | A1 | 9/2002 | Sirhan et al. | |
| 2002/0173817 | A1 * | 11/2002 | Kletschka | A61M 25/0029 606/192 |
| 2003/0040704 | A1 * | 2/2003 | Dorros | A61B 17/3207 604/509 |
| 2003/0220666 | A1 | 11/2003 | Mirigian et al. | |
| 2004/0059290 | A1 * | 3/2004 | Palasis | A61M 25/104 604/102.01 |
| 2004/0210297 | A1 * | 10/2004 | Lin | A61B 17/7097 606/92 |
| 2005/0015047 | A1 | 1/2005 | Shah | |
| 2005/0113687 | A1 * | 5/2005 | Herweck | A61M 25/10 600/435 |
| 2006/0173486 | A1 * | 8/2006 | Burke | A61B 17/12099 606/193 |
| 2007/0265600 | A1 * | 11/2007 | Barlow | A61B 17/12099 600/116 |
| 2008/0033480 | A1 | 2/2008 | Hardert | |
| 2008/0109056 | A1 * | 5/2008 | Chalekian | A61M 25/1002 623/1.11 |
| 2008/0215031 | A1 | 9/2008 | Belfort et al. | |
| 2008/0243068 | A1 * | 10/2008 | Ramzipoor | A61B 17/1214 604/103.05 |
| 2009/0187098 | A1 * | 7/2009 | Makower | A61B 90/36 600/101 |
| 2011/0125132 | A1 | 5/2011 | Krolik et al. | |
| 2011/0137317 | A1 * | 6/2011 | O'Halloran | A61B 17/7097 606/92 |
| 2011/0201966 | A1 * | 8/2011 | Lubock | A61N 5/1015 600/567 |
| 2011/0319866 | A1 * | 12/2011 | Consigny | A61M 25/10184 604/509 |
| 2012/0035588 | A1 | 2/2012 | Schoenle et al. | |
| 2012/0165732 | A1 * | 6/2012 | Muller | A61B 17/8855 604/99.01 |
| 2012/0191123 | A1 * | 7/2012 | Brister | A61M 25/10187 606/191 |
| 2013/0035710 | A1 | 2/2013 | Bouasaysy et al. | |
| 2013/0296781 | A1 | 11/2013 | Tegg et al. | |
| 2014/0012307 | A1 | 1/2014 | Franano et al. | |
| 2014/0379021 | A1 * | 12/2014 | Krishnan | A61B 17/12136 606/194 |
| 2015/0202089 | A1 * | 7/2015 | Campbell | A61M 31/00 600/478 |
| 2015/0216533 | A1 * | 8/2015 | Gray | A61B 17/12109 606/195 |
| 2016/0045202 | A1 | 2/2016 | Ferry et al. | |
| 2016/0045719 | A1 | 2/2016 | Ha et al. | |
| 2016/0089518 | A1 | 3/2016 | Williamson | |
| 2016/0249934 | A1 * | 9/2016 | Hewitt | A61B 17/12031 606/200 |
| 2016/0338720 | A1 * | 11/2016 | Kassab | A61B 17/22 |
| 2017/0042519 | A1 * | 2/2017 | Sotak | A61B 17/00491 |
| 2017/0340434 | A1 * | 11/2017 | Cerchiari | A61M 25/1002 |
| 2018/0015265 | A1 | 1/2018 | Jamous et al. | |
| 2018/0093079 | A1 * | 4/2018 | Fox | A61M 25/10184 |
| 2018/0199981 | A1 * | 7/2018 | Sheets | A61B 18/02 |
| 2018/0207408 | A1 * | 7/2018 | Neal | A61M 25/0026 |
| 2019/0105474 | A1 | 4/2019 | Sheibley | |
| 2020/0015827 | A1 | 1/2020 | Anderson et al. | |
| 2020/0146858 | A1 * | 5/2020 | Wolenberg | A61M 25/1011 |
| 2020/0254226 | A1 * | 8/2020 | Connors | A61M 25/10 |
| 2020/0337717 | A1 | 10/2020 | Walzman | |
| 2020/0353205 | A1 * | 11/2020 | Kelly | A61M 25/005 |
| 2022/0000498 | A1 * | 1/2022 | Leuthardt | A61B 17/320725 |
| 2022/0249813 | A1 * | 8/2022 | Pyne | A61M 25/1002 |
| 2023/0023513 | A1 | 1/2023 | Ji et al. | |
| 2023/0190294 | A1 * | 6/2023 | Dasnurkar | A61B 17/12186 604/509 |
| 2023/0293877 | A1 * | 9/2023 | Hoem | A61M 60/32 600/17 |
| 2023/0309842 | A1 * | 10/2023 | Alexander | A61B 5/02141 604/96.01 |
| 2023/0355242 | A1 * | 11/2023 | Kudisch | A61L 29/04 |

OTHER PUBLICATIONS

Final Office Action issued in related U.S. Appl. No. 17/666,199 on issue Date; Jan. 18, 2024.
Non Final Office Action issued in related U.S. Appl. No. 17/666,199 on issue Date; Jul. 6, 2023.
Non-Final Office Action issued in related U.S. Appl. No. 18/126,419 on issue Nov. 7, 2023.
Final Office Action issued in related U.S. Appl. No. 18/126,419 on Aug. 21, 2024.

* cited by examiner

DETACHABLE BALLOON EMBOLIZATION DEVICE AND METHODS

CROSS-REFERENCES TO RELATED APPLICATIONS

This non-provisional patent application claims benefit and priority to, and is a divisional of co-pending U.S. patent application Ser. No. 17/666,199 filed Feb. 7, 2022, which is a non-provisional of U.S. Provisional Patent Application No. 63/146,166 which was filed on Feb. 5, 2021, both of which are hereby incorporated by reference in the entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

None.

REFERENCE TO SEQUENCE LISTING OR COMPUTER PROGRAM LISTING APPENDIX

None.

BACKGROUND

The present invention relates generally to devices and methods for controlling the flow of blood in humans and animals, and more particularly to devices for embolization of blood vessels in general as well as specifically for embolization of aneurysms.

Blood is moved throughout the body via the circulatory system via an intricate and complex network of blood vessels. By definition, arteries bring pumped blood from the heart to other organs and musculature, systematically branching into smaller and smaller branches akin to a tree, either to supply oxygenated blood (systemic circulation) or to move blood to get oxygenated in the lungs (pulmonary circulation). Conversely, veins return deoxygenated blood used by organs and musculature in the systemic circulation by progressively draining into larger veins until blood is returned to the heart; veins in the pulmonary circulation return blood which has been oxygenated in the lungs back to the heart.

Due to various disease processes such as trauma, aneurysms, gastrointestinal bleeds, bleeding during procedures/surgeries (termed iatrogenic bleeding), tumors, or even to change physiologic or pathophysiologic flow for numerous other reasons, it is not uncommon for physicians to emergently or electively need to close down blood vessels, either temporarily or permanently. The severity and danger of a bleeding vessel depends on multiple factors, and the most dangerous include but are not limited to: larger size of the vessel, pressure in the vessel (arteries are more pressurized given pumping from the heart ventricles and their arterial wall structure), location of the vessel (i.e., bleeding artery in the brain is much more dangerous than in the arm), whether another structure can tamponade (or block and contain) the bleed to limit the blood that escapes from circulatory system, and finally depending on how well that person's body can thrombose the abnormal bleeding (i.e., can they clot properly, are they on blood thinners, etc.). Depending on those and other factors, bleeding can range from asymptomatic or mild discomfort all the way to hypotension to complete circulatory collapse, termed hypovolemic shock, which can ultimately lead to death.

As previously mentioned, a common pathophysiology encountered in the vascular world is an aneurysm, which refers to an unnatural expansion or outpouching of an artery. The most feared and catastrophic complication of an aneurysm is the possibility that the enlarged/stretched wall of the aneurysm has weakened over time and ultimately ruptures. The two common morphologies of aneurysms are fusiform, which means that the entire circumference of the artery is enlarged, and saccular, which means that there is a focal outpouching in the artery.

Medicine and surgery have been trying to combat minor bleeding to severe hemorrhaging for millennia. Medical treatments include volume resuscitation by giving fluids or even blood to replace the lost blood, giving medications such as inotropic agents to keep blood pressure up and prevent shock, giving agents to promote clotting, such as platelets and fresh frozen plasma, counteracting bleeding diatheses, correcting medications preventing clotting (typically known anticoagulants), providing bowel rest and giving proton pump inhibitors to minimize gastric acid secretion, and other various treatments. While this may work well for smaller bleeds, larger bleeds often need to be controlled mechanically to prevent further morbidity and mortality.

Older, more traditional surgical methods of stopping bleeding include techniques such as holding pressure (if the bleeding is visible or close to the skin), clamping a vessel (i.e., cinching it down with a clamp temporarily or clip permanently), ligating (or tying off) a vessel with a suture, surgically repairing a vessel with a patch or sewing the bleeding site shut, or even surgically resecting the vessel from the body if needed. Many of the above are complex and challenging surgeries performed by vascular surgeons or trauma surgeons which entail obvious high risk depending on the vessel, the location, and the patient's state and other comorbidities. In the past few decades, newer methods to control bleeding have been created via open surgical, laparoscopic, or endoscopic surgical methods such as banding vessels with medical rubber bands or sclerosing (externally injecting with a medicine) certain vessels closed.

Embolization refers to stopping blood flow in a vessel via a minimally invasive technique of entering the vessel and blocking flow from an internal, or endovascular, approach. The most common embolization is blocking flow in an artery, called an arterial embolization. For a typical arterial embolization, this technique involves first gaining access to the arterial system called catheterization. As opposed to most of the surgical methods described above, catheterization typically does not need general anesthesia and can be performed typically with moderate sedation. After the patient is sedated, a small amount of anesthetic such as lidocaine is given in the skin and a tiny incision is made. Either by palpating the vessel or typically now using ultrasound guidance, the artery is then accessed using a small needle. The most common arterial entry sites are the common femoral artery in the groin and the radial artery in the wrist. The entry needle is then exchanged over a wire for a small tube called a catheter, which is then navigating throughout the body using wires and contrast and seen in real-time using x-ray guidance called fluoroscopy. Once at the site of the bleed, various ingenious techniques and devices have been developed over time that are used to attempt to control and stop the bleeding.

There are different reasons to perform embolization, and one common reason is to achieve tissue infarct for reasons such as tumor embolization, uterine fibroid embolization, and prostate artery embolization. In order to stop blood flow to abnormal tissue, the goal is to embolize as distally (far downstream) as possible to avoid the possibility of other blood source detouring around the embolization. For this purpose, tiny particles—just small enough to lodge into the tiniest vessel feeding the abnormal tissue—are generally injecting.

Other complex vascular pathophysiology require blood flow to be closed down in various shapes, such as in arteriovenous malformations, high flow arteriovenous fistulas, amorphous endoleaks, or angiomyolipomas. In these cases, a smaller catheter called a microcatheter may be advanced to the site and liquid embolics such as surgical-grade glue, alcohol, or Onyx can be used along with other devices.

However, for the majority of bleeding issues such as trauma, GI bleeds, and other large vessel bleeding from various causes, the goal is to simply stop the pressure head of the uncontrolled bleed, and to preserve flow to the downstream organ or musculature, in essence avoiding downstream tissue infarct. The exact site of embolization in a vessel is typically just proximal (before) the site of downstream bleeding, or oftentimes across the site of bleeding if it is felt that the cessation of flow at that location may change the hemodynamics such that "backdoor" bleeding from the other site may occur. Obviously, in these larger vessel embolizations, the question is whether it is safe to the body, based on risks and benefits, to shut down flow in that vessel. If so, this type of embolization is typically known as a "vessel sacrifice". Generally, in this type of embolization, as opposed to using particles or liquid embolics, the goal is stopping the flow in that vessel at that exact site, and potentially continue to allow flow downstream to the intended target organ or musculature.

Many techniques and devices have been developed over past few decades for vessel sacrifice. One of the first techniques was autologous clot embolization, which entailed taking blood from the patient's body, allowing it to form a thrombus (clot), and then injecting that back into the vessel via the catheter at that site. This is rarely if ever used today due to lack of control and inconsistency. Another older but still commonly used embolic is Gelfoam, a sponge-like material that can be cut up, rolled up, and/or mixed with liquid to create slurry or "torpedoes", all while compressing it through the catheter or microcatheter to then allow it to expand in the blood vessel and obstruct flow. Over the course of a few weeks, the vessel then slowly recanalizes. This is therefore commonly used in the setting of trauma or postpartum hemorrhage. Both these first two embolization techniques are readily available, cheap, and fairly easy to learn, but both have the major issue of lack of control of where the final embolic may end up. This last point, that an embolic particle may move downstream with the flow of blood or otherwise migrate to an unintended location, is one of the most common and most immediate fears when performing an embolization. The complication is termed nontarget embolization.

A few decades ago, embolic devices started expanding with the advent of embolization coils. Coils are fairly soft but generally memory-retentive metal that have the morphology and appearance of small wires. They are made to the size of the catheter or microcatheter being used, and ideally will build up into a "ball of yarn" at the intended embolization site and occlude flow. In their original iteration, the goal of coils was to create a matrix for the thrombotic cascade to occur, which means the coil was supposed to build a "scaffold" to attract platelets and thrombin, which would then start the clotting process. Coils come in many shapes and sizes (such as straight, helical, or tornado-shaped), and the original ones and subsequent versions come heathered with fibers or expanding gel attached to them to fill in the empty space and have the platelets and fibrin attach. Newer generations of coils have become softer, with more complex shapes, longer, thicker, more easily trackable through long microcatheters, and now have more control as they stay attached to the pushing wire of the coil until it is ready to be deployed. In many practices, these "detachable" coils have become the standard of care for vessel sacrifice due to their ease of use, controllability, and relative affordability.

Similar and novel embolization devices have also sprung up over the past decade plus to compete and/or augment coil embolics. Vascular plugs are another broad category of embolics that were limited previously due to their larger profile that required very large catheters to deliver. In recent years, newer smaller vascular plugs are allowing delivery through smaller catheters and microcatheters. Additionally, there is increasing utilization for the aforementioned glue and Gelfoam in larger arteries in various circumstances. Overall, embolization has become the gold standard for nearly all types of vascular bleeding as it is generally more effective, quicker, and safer than opening the patient surgically, and has less overall risk.

Similarly, minimally invasive endovascular embolization for aneurysms has essentially also replaced open surgical repair and clipping. For fusiform aneurysms, the gold standard now for most patients with aneurysms in larger, accessible arteries is generally repair with a stent graft (a metallic stent covered with an impermeable material) to exclude the enlarged and weakened segment. Stent graft exclusion of aneurysms can also be performed for saccular aneurysms, however, given the difficulty in maneuvering a large profile stent graft and given that typically the location of aneurysms in tortuous vessels and at branch points makes placing stent grafts not feasible for most saccular aneurysms. Therefore, stent grafts are mainly limited to larger arteries which are fairly straight. Despite advancements in stent grafts become smaller in profile and more flexible, limitations of stent grafts still remain today.

Similarly, saccular aneurysm treatment has also evolved greatly over the past two decades. For many saccular aneurysms, coiling has become the gold standard. The key to successfully being able to embolize a saccular aneurysm lies in terms of the aneurysm location in relation to the vessel or branch point as well as in its morphology, especially depending on the size of the aneurysm neck. For "narrow" neck aneurysms, the goal of coils or other embolics will be to try to keep them in place without fear of the coil pack migrating out of the aneurysm.

However, "wide neck" aneurysms still pose a conundrum for treatment given that there is no guarantee of the coil or other embolic staying in place within the intended aneurysm target, especially given that many of these aneurysms form in turbulent, high flow areas. Again, the fear is that there will be immediate or delayed nontarget embolization. In the body, this can mean stoppage of flow to a critical organ or limb, while in the brain it results in stroke or death.

Additionally, a new category of aneurysm repair devices has entered the market in the past few years and are called "flow diverters." These are similar to stent graft but have no impermeable covering around the metal struts; rather, they are configured such that the metal struts "bunch" in certain areas (ideally at the neck of the aneurysm) to divert flow away from the aneurysm rather than occlude the aneurysm from the inside. These are smaller and travel better than stent grafts, and thus their primary use is in the cerebral vasculature. Other recent devices coming to market include spherical mesh vascular plugs meant to sit inside and occlude flow in to saccular aneurysms as opposed to vessel sacrifice. Finally, for saccular aneurysms which are at branch points which cannot be stent-assisted coil embolized, other new devices in the design of scaffolds have recently come out to help keep coils inside challenging-anatomy aneurysms.

Vessel embolization and aneurysm embolization mixes a good deal of art with science. Although ingenuity and creativity in advancing techniques has been astounding in the past 20 years, much of what the endovascular community can achieve is still limited by what products are commercially available and FDA-approved.

While the aforementioned devices and techniques seem simple and elegant in theory, trying to achieve a perfect embolization is challenging and stressful. The planning and execution of either a large or a tiny aneurysm with high flow in a turbulent bifurcation in an aneurysm that may rupture or the thought that any tiny downstream nontarget embolization could result in catastrophic injury or death makes these some of the most challenging and rewarding endovascular cases.

Many conventional solutions to embolization are thus problematic because they are hard to control and use, they do not consistently work, they require multiple coils, they have large profiles, they are hard to track, they leave streak artifacts, they have a high learning curve and/or they can be very expensive. New solutions to embolization devices and methods are needed to overcome these deficiencies.

What is needed, then, are evolutionary improvements or even a completely new innovation in devices and methods for embolization of vessels as well as aneurysms.

BRIEF SUMMARY

One aspect of the present disclosure provides a detachable embolization balloon device. The balloon apparatus includes a cannula with a guide wire lumen defined axially through the cannula and an inflation lumen defined partially axially through the cannula. A valve sleeve is disposed over the exterior of the cannula, and a balloon is disposed over the exterior of the valve sleeve. The valve sleeve and the balloon are sealed against the cannula at each end. The valve sleeve forms a check valve that allows inflation of the balloon via an inflation channel in the microcatheter, but prevents leakage of the inflation medium from the balloon once inflated.

In some embodiments, the apparatus can be inserted via the distal end of a catheter through a vessel to the precise desired location, such as at the site of arterial bleeding or in an aneurysm. Once positioned, the balloon is inflated by passing a gas or liquid inflation medium through an inflation channel in the catheter and into the inflation lumen on the cannula.

In some embodiments, the inflation medium travels through the inflation lumen on the cannula and out an inflation port defined in the cannula wall. The inflation medium then enters a plenum formed between the outer surface of the cannula and the inner surface of the valve sleeve, and eventually exits through a vent defined in the valve sleeve. The inflation medium is then trapped between the balloon and the valve sleeve, inflating the balloon to a desired size. Once inflated, the balloon apparatus releases from the distal tip of the catheter by a friction fit release mechanism, and the catheter can be withdrawn from the vasculature leaving the inflated balloon apparatus in place.

In some embodiments, the balloon apparatus includes a first end and a second end. A first marker band is positioned on the first end, and a second marker band is positioned on the second end. The first and second markers comprise a radio-opaque material in some embodiments such that the location of the apparatus can be observed fluoroscopically in real time imaging during surgery, and the device can be guided to a precise location by observing the position of the marker bands using appropriate imaging equipment.

In further embodiments, the present disclosure provides a system for embolization of an aneurysm. The system includes a microcatheter configured for detachable connection to a balloon device, and a balloon device detachably mounted on the distal end of the microcatheter for insertion into a patient's body. The microcatheter includes a guide wire lumen channel and a separate inflation channel. The inflation channel of the microcatheter is in fluid communication with an inflation lumen on the balloon device. When inflation medium such as a liquid or gas is introduced through the inflation channel in the microcatheter into the inflation lumen, the balloon device becomes inflated, thereby mechanically occluding the flow of blood in the aneurysm. The microcatheter may be easily detached from the balloon by simply pulling on the microcatheter, which causes the friction fit interface between the balloon and the microcatheter to release. This allows the inflated balloon to remain in position inside the body when the microcatheter is withdrawn.

In some embodiments, the present disclosure provides a balloon embolization device configured to occlude flow mechanically, regardless of a patient's ability to naturally clot.

In further embodiments, the present disclosure provides a balloon embolization device configured to occlude flow quickly upon inflation, but not irreversibly.

In further embodiments, the present disclosure provides a balloon embolization device configured to achieve optimized aneurysm fill by conforming to the vessel lumen or aneurysm regardless of shape.

In further embodiments, the present disclosure provides a balloon embolization device configured to be detachable and controllable for precise placement which stays in place.

In further embodiments, the present disclosure provides a balloon embolization device configured to allow for recapture and repositioning for optimal placement.

In further embodiments, the present disclosure provides a balloon embolization device configured to be mounted on a microcatheter, such as but not limited to a 2.7 Fr dual channel microcatheter configured for insertion along a guide wire.

In further embodiments, the present disclosure provides a balloon embolization device configured to be quickly and easily deployed.

In further embodiments, the present disclosure provides a balloon embolization device configured to have an easy and reliable detachment from the microcatheter following inflation.

In further embodiments, the present disclosure provides a balloon embolization device configured to be soft upon insertion and prevent microcatheter overtravel or "kickout" during insertion.

In further embodiments, the present disclosure provides a balloon embolization device configured to provide no artifact on follow-up imaging secondary to its lack of metal components.

In further embodiments, the present disclosure provides a balloon embolization device configured to have a relatively low cost when compared to other embolization devices.

A further objective of the present disclosure is to provide a balloon embolization device with a self-sealing configuration that will retain liquid or gas when inflated and detached from the catheter.

Numerous other objects, advantages and features of the present disclosure will be readily apparent to those of skill in the art upon a review of the following drawings and description of a preferred embodiment.

DETAILED DESCRIPTION

Figure 1:
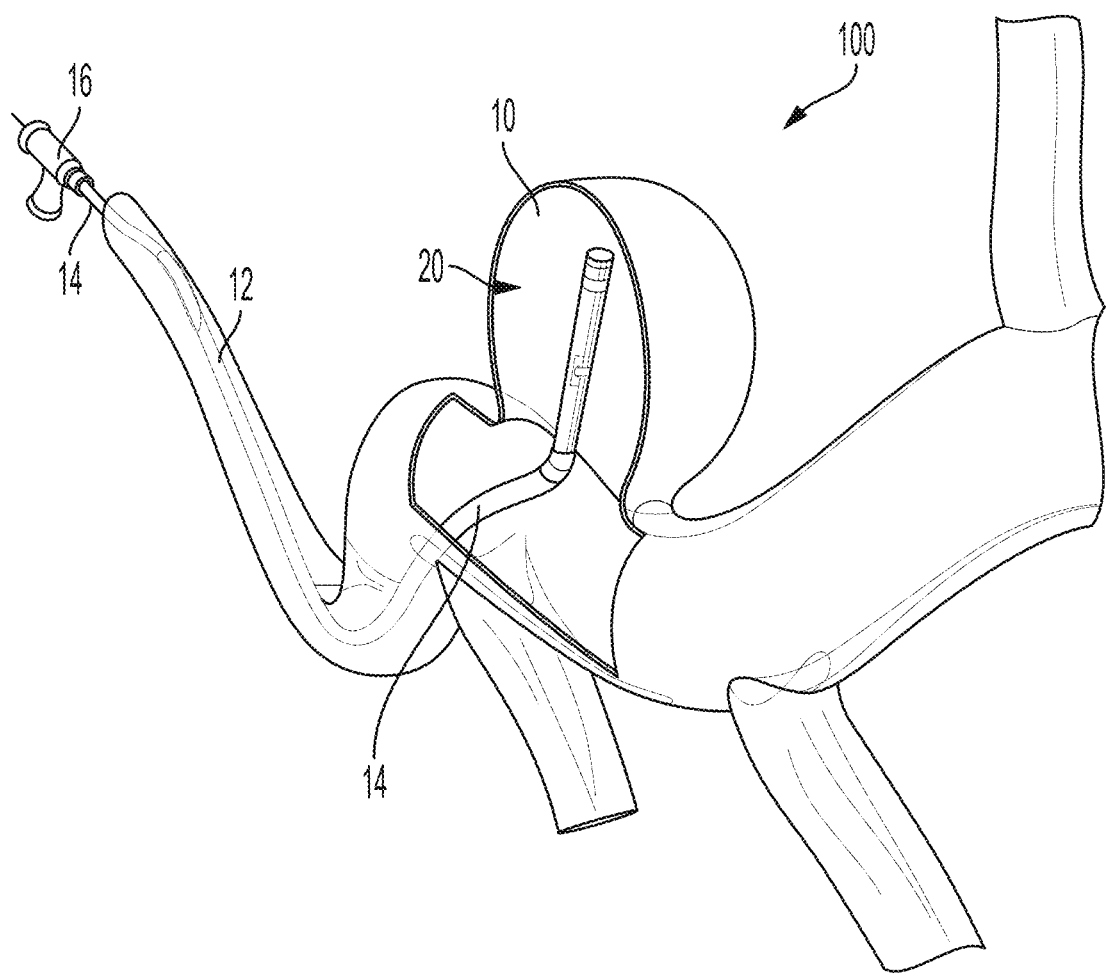
FIG. 1 illustrates a perspective view of an embodiment of an uninflated balloon assembly positioned via a vascular catheter for embolization of a saccular aneurysm.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

The present invention provides a detachable balloon apparatus, methods and system for embolization of an aneurysm. The balloon apparatus can be detachably mounted to the distal end of a catheter, can be inserted through vasculature in a human or animal, can be positioned at a desired location, can be inflated with a fluid (e.g., a liquid or a gas), and can be easily detached from the catheter and remain in place to provide quick and safe embolization following removal of the catheter.

Figure 2:
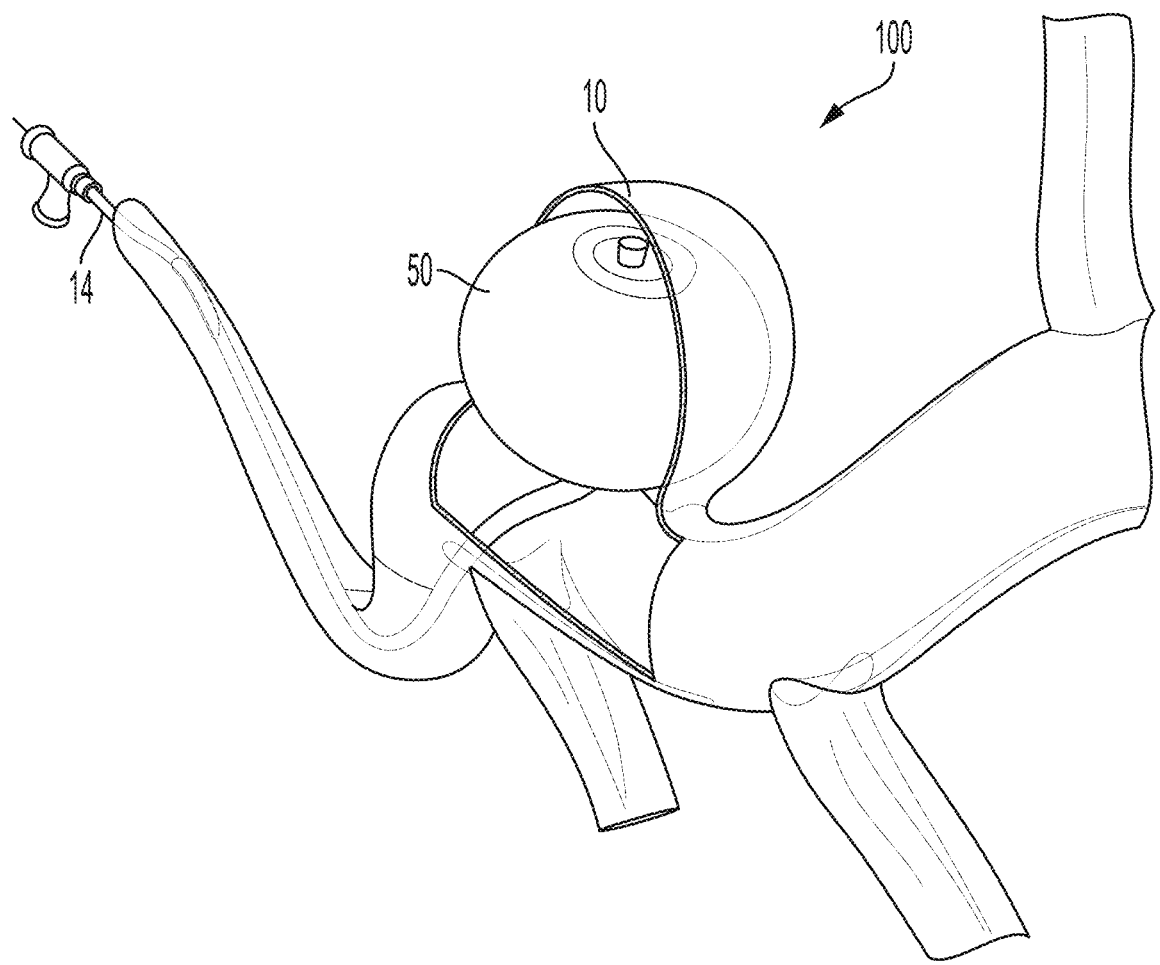
FIG. 2 illustrates a perspective view of the embodiment of a balloon assembly of FIG. 1 in an inflated state inside of a saccular aneurysm.
Figure 3:
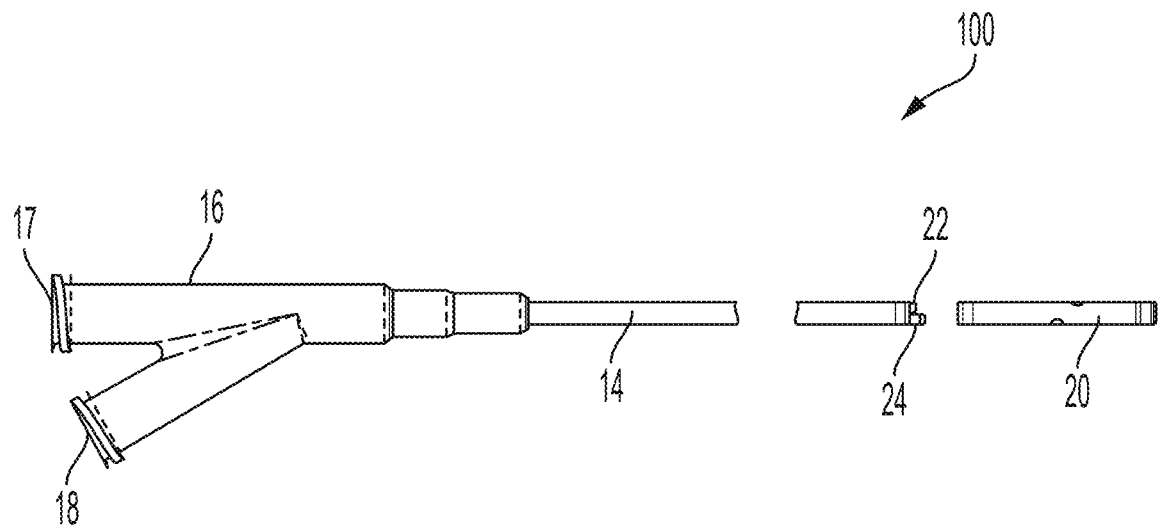
FIG. 3 illustrates a plan view of an embodiment of a balloon embolization system with an inflatable balloon assembly detached from the distal end of a catheter.

Referring to FIG. 1 and FIG. 2, an introductory embodiment of a balloon embolization system is generally illustrated. Although the system shown in this embodiment is for treatment of a saccular aneurysm 10, the system 100 may be used to treat any type of spherical saccular aneurysm in both neurovascular and peripheral applications as well to embolize any cylindrical vessel including arteries and veins in both the peripheral and neurovascular territories. System 100 includes a catheter 14 inserted through vasculature 12 of a patient. The catheter 14 includes a dual-lumen, or dual-channel configuration. Specifically, in some embodiments, catheter 14 includes a 2.7 Fr microcatheter including a guide wire channel and an inflation channel defined on the interior of the catheter body. As is shown in FIG. 3, the catheter 14 is coupled to a Y-connector 16 in some embodiments. As shown in FIG. 1, a balloon apparatus 20 is positioned on the distal end of the catheter 14. The balloon apparatus 20 may be steered through the vasculature 12 to an aneurysm 10, inserted into the aneurysm cavity, and inflated via a balloon 50, shown in FIG. 2. The balloon 50 fills with a fluid inflation medium and closely fits the interior space of the aneurysm 10. Following inflation, the balloon apparatus 20 may be quickly detached from the catheter 14, and the catheter may be withdrawn from the vasculature 12, leaving the inflated balloon 50 in place inside the aneurysm 10.

Referring to FIG. 3, an embodiment of a balloon embolization system 100 is shown, including a microcatheter 14, a Y-connector 16 positioned at a proximal end of the microcatheter 14, and a balloon apparatus 20 positioned at the distal end of the microcatheter. The balloon apparatus 20 is detachable from the microcatheter 14. The Y-connector 16 may include a first channel 17 and a second channel 18. In some embodiments, the distal end of the microcatheter 14 includes one or more plugs for providing a detachable connection to the balloon apparatus 20. For example, in some embodiments, microcatheter 14 includes a first plug 22 and a second plug 24 protruding from the distal end of the microcatheter 14. In other embodiments, microcatheter 14 may include only one plug, or more than two plugs. In alternative embodiments, one plug, two plugs or more than two plugs protrude from the balloon apparatus 20 and extend toward and into the microcatheter 14 in a reverse configuration.

Figure 4:
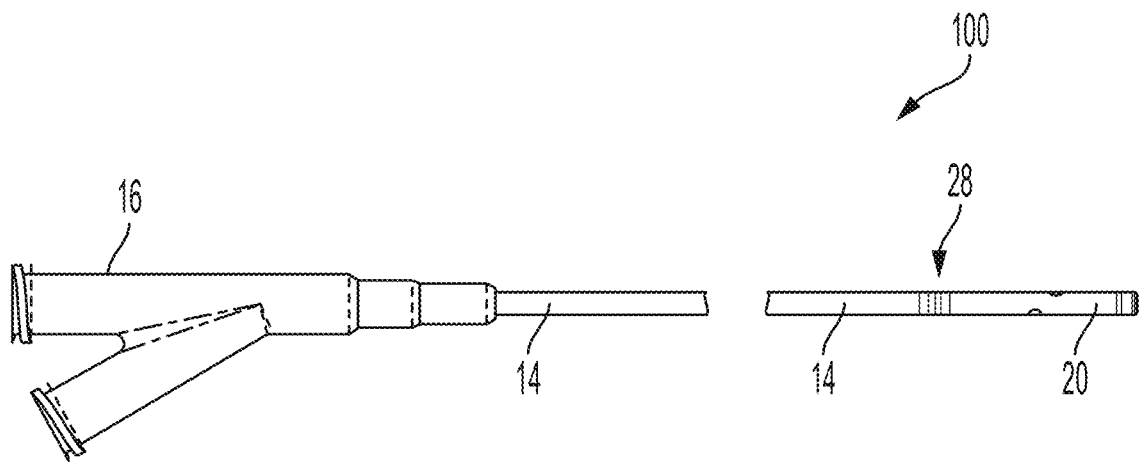
FIG. 4 illustrates a plan view of the embodiment of the balloon embolization system of FIG. 3 with the inflatable balloon assembly attached to the distal end of the catheter.

Referring further to FIG. 3, the first and second plugs 22, 24 interface with the balloon apparatus 20 in a detachable configuration. Referring to FIG. 4, the balloon apparatus 20 is mounted on the distal end of the catheter 14 at a detachable joint 28. During use, the balloon apparatus 20 may be easily separated from the catheter 14 at the detachable joint 28 following inflation of the balloon apparatus 20 simply by pulling slightly on the microcatheter 14 to release a friction fit.

Figure 5:
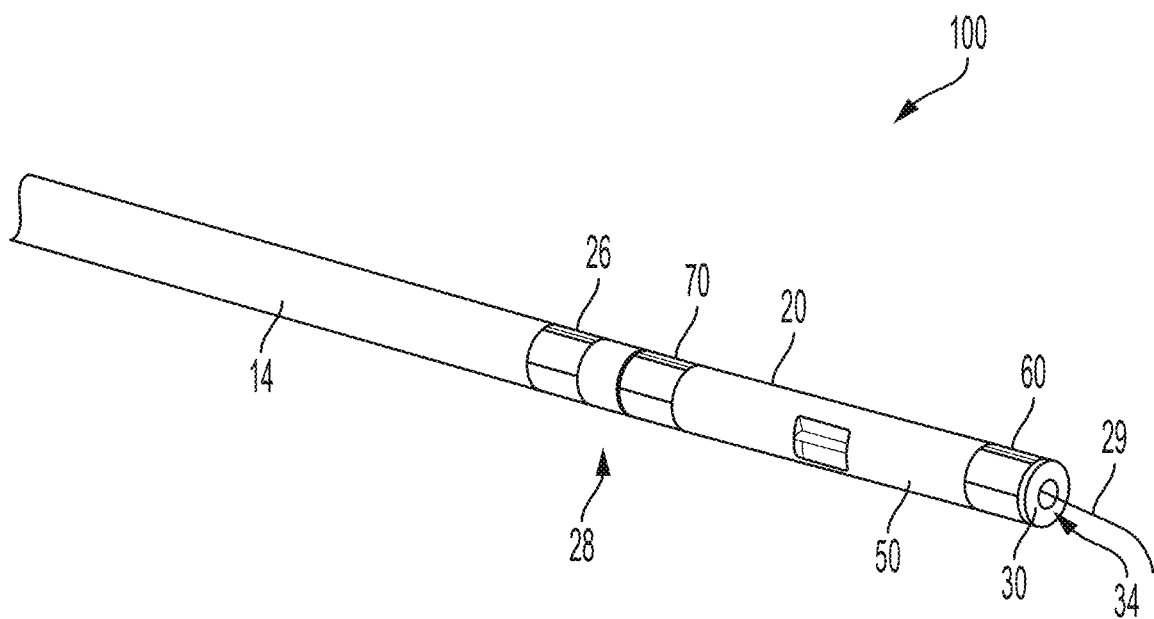
FIG. 5 illustrates a perspective view of an embodiment of a balloon embolization system including an inflatable balloon assembly attached to the distal end of a catheter.

Referring to FIG. 5, an embodiment of a balloon embolization system 100 is shown in greater detail. In some embodiments, balloon apparatus 20 is attached to catheter 14 at a detachable joint 28. Balloon apparatus 20 includes an outer layer including an inflatable balloon 50. Balloon apparatus 20 includes an axial guide wire lumen 34 defined through an elongated cannula 30. The system 100 may be passed over a guide wire 29 extending through guide wire lumen 34 and inside catheter 14. As shown in FIG. 5, in some embodiments, a catheter marker band 26 is disposed on the distal end of catheter 14. Similarly, a first marker band 60 and a second marker band 70 are disposed on balloon apparatus 20. Each marker band includes a device visible under fluoroscopy and may be used to guide and place the catheter 14 and balloon device 20. In some embodiments, each marker band comprises a metal material. In further embodiments one or more marker bands comprise polymer or metal-filled polymer material.

Figure 6:
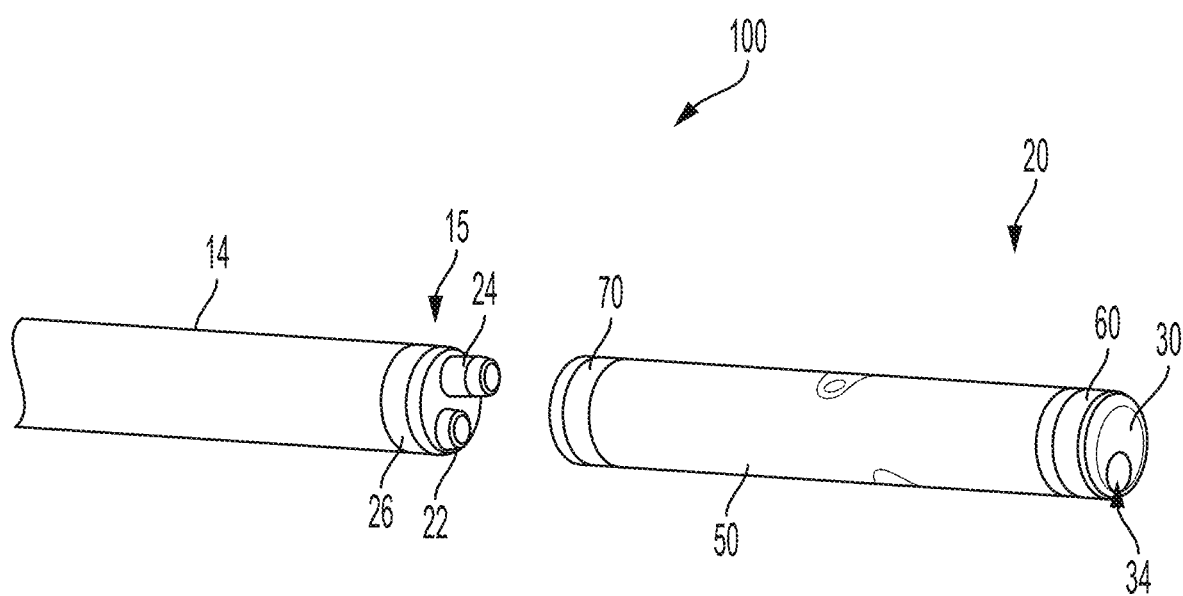
FIG. 6 illustrates a perspective view of an embodiment of a balloon embolization system including a detachable and inflatable balloon assembly detached from the distal end of a catheter.

Referring to FIG. 6, an embodiment of a balloon embolization system 100 includes a catheter 14 with a distal end 15. The distal end 15 of the catheter 14 includes a mechanical interface configured for detachably coupling with the balloon apparatus 20. In some embodiments, catheter 14 includes first and second axial channels defined through the interior of the catheter. A first plug 22 is positioned on the first channel in catheter 14, and a second plug 24 is positioned on the second channel in catheter 14. First and second plugs 22, 24 each protrude from the distal end 15 of catheter 14 toward balloon apparatus 20. First and second plugs each include a central bore configured to allow passage of guide wire, liquid or gas. First plug 22 is shorter in axial length than second plug 24 in some embodiments.

First plug 22 is configured to fit inside an interior lumen in cannula 30 in an interference fit in some embodiments. As such, first plug 22 may be received inside guide wire lumen 34 in a friction fit when balloon apparatus 20 is installed on the distal end 15 of catheter 14. In other embodiments, first plug 22 does not engage cannula 30 in a friction fit, but merely provides an alignment function that prevents rotation of cannula 30.

Similarly, second plug 24 may be received in a second lumen inside cannula 30 in a friction fit. Second plug 24 engages an inflation lumen in cannula 30 to provide passage of an inflation medium such as a liquid or gas into cannula 30. Second plug 24 thus provides a gas-tight interface between catheter 14 and balloon device 20.

Figure 7:
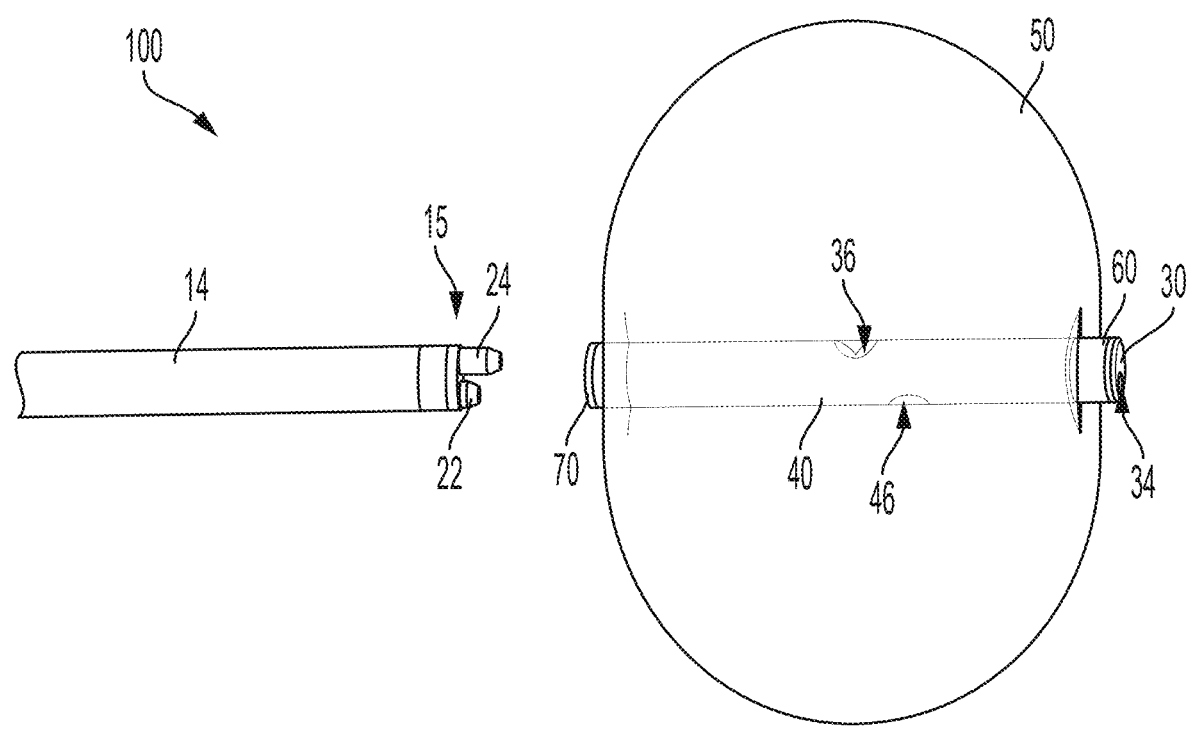
FIG. 7 illustrates a perspective view of an embodiment of a balloon embolization system including a detachable balloon assembly in an inflated state detached from the distal end of a catheter.

Referring to FIG. 7, an embodiment of a balloon embolization system 100 is shown with a balloon apparatus 20 inflated and detached from the distal end 15 of catheter 14. Balloon apparatus 20 includes an elongated cannula 30 forming a base, or frame, of the balloon apparatus 20. A valve sleeve 40 is positioned on cannula 30, and balloon 50 is positioned over valve sleeve 40. When balloon 50 is inflated, balloon 50 expands radially beyond valve sleeve 40. In some embodiments, balloon apparatus 20 comprises three main components including cannula 30, valve sleeve 40 and balloon 50, shown in more detail in FIGS. 8-10. These components are arranged in a self-sealing configuration such that liquid or gas inflation medium is trapped inside balloon 50, but may not leak from the balloon once inflated.

Figure 8A:
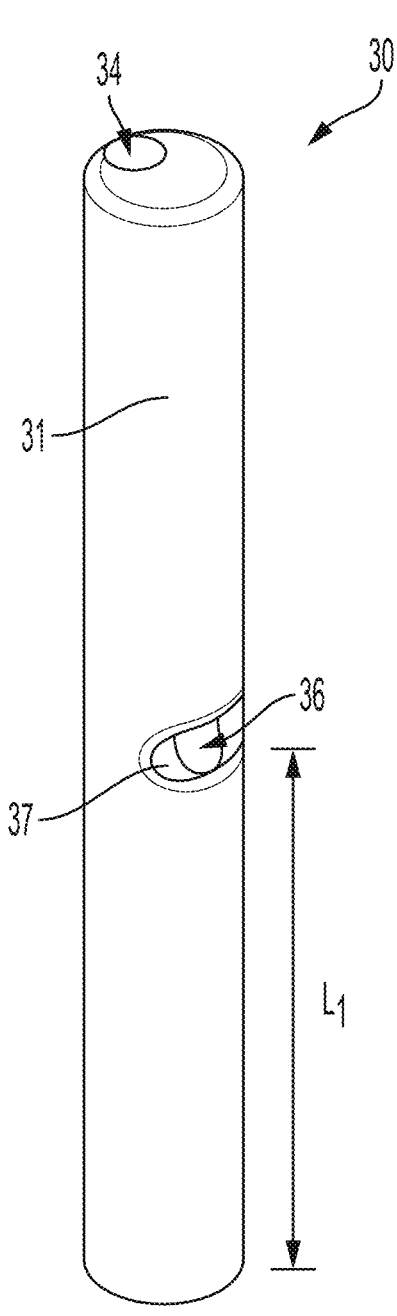
FIG. 8A illustrates a perspective view of a cannula for use with a balloon assembly.
Figure 8B:
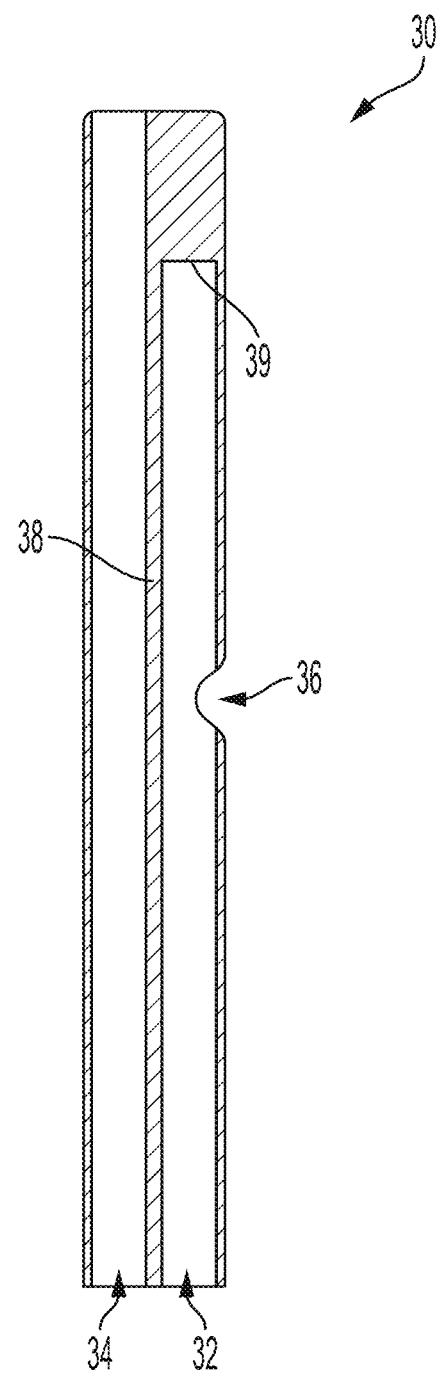
FIG. 8B illustrates a cross-sectional view of a cannula for use with a balloon assembly.

Referring to FIG. 8, a cannula 30 comprises an elongated cylinder 31 in some embodiments. Cannula 30 is dimensioned with an outer diameter substantially the same as the outer diameter of catheter 14 in some embodiments. In some embodiments, cannula 30 includes an outer diameter of about 2.7 Fr. The outer diameter and axial length of cannula 30 may be tailored to fit specific applications. For example, to embolize a larger vessel or aneurysm, cannula 30 may have a longer length, but for small aneurysms the axial length of cannula 30 may be shorter. In some embodiments, the balloon embolization system comprises a kit of various balloon devices including cannulas 30 having different lengths and/or diameters that may be specifically matched to vessels and aneurysms of different sizes. In some embodiments, cannula 30 comprises a metal material. In other embodiments, cannula 30 comprises a polymer material.

Referring further to FIG. 8, cannula 30 includes a first lumen 34 defined axially through the cannula body. Fist lumen 34 includes an inner diameter dimensioned to receive a guide wire of the types used for catheter insertion and steering and thus may be referred to as a guide wire lumen. In some embodiments, first lumen inner diameter is between about 0.8 mm and about 1.1 mm, however the inner diameter of first lumen 34 may vary depending on the application. First lumen 34 is offset from the center axis of cannula 30 in some embodiments, as shown in the cross-sectional view of FIG. 8.

Referring further to FIG. 8, cannula 30 includes a second lumen 32 defined axially partially through cannula 30. Second lumen 32 includes a blind end 39 in some embodiments. In other embodiments, second lumen 32 is defined entirely through cannula 30 and is plugged at the distal end instead of being formed with a blind end. Second lumen 32 includes an inflation lumen through which a fluid may be passed for inflating balloon apparatus 20. Second lumen 32 may include the same inner diameter as first lumen 34 in some embodiments, or may have a different diameter in other embodiments. A wall 38 is defined inside cannula 30 between first and second lumens 34, 32. Wall 38 includes a wall thickness sufficient to prevent leakage of fluid into the guide wire lumen as the fluid passes into and through second lumen 32 in some embodiments. In some embodiments, a fluid may include a gas or a liquid. A gas may include a pressurized gas, and a liquid may include a pressurized liquid.

As shown in FIG. 8, an inflation port 36 is defined in cannula 30. Inflation port 36 is in fluid communication with second lumen 32 such that fluid traveling into second lumen 32 may exit cannula 30 through inflation port 36. Inflation port 36 comprises one or more holes drilled or otherwise formed through the side wall of cannula 30. In some embodiments, a transverse cylindrical recess 37 is machined or formed in cannula 30 adjacent to inflation port 36. Additionally, the cannula wall surrounding inflation port 36 is chamfered in some embodiments. Such configuration provides a vacant space on the exterior surface of cannula 30 to allow accumulation of fluid to form in a local pocket to press against the inner wall of valve sleeve 40 in some embodiments during inflation.

Figure 9:
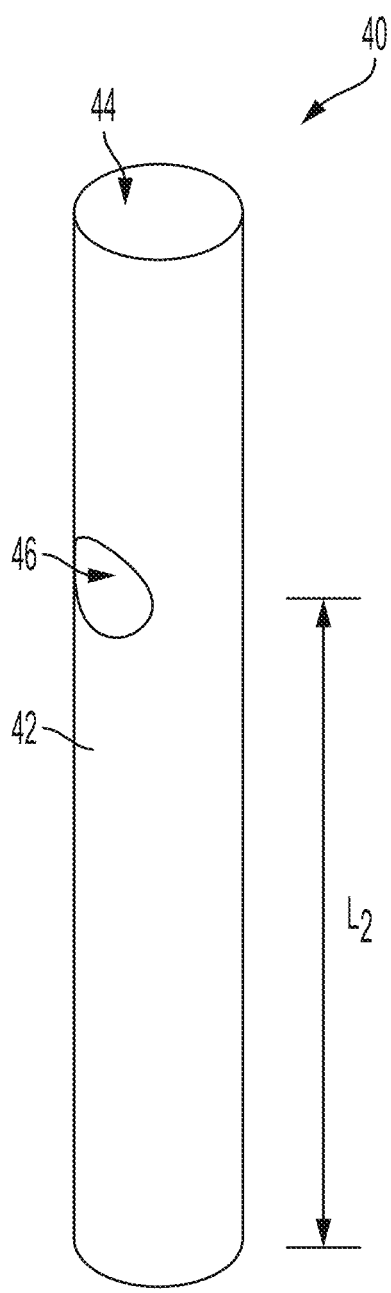
FIG. 9 illustrates a perspective view of a valve sleeve for use with a balloon assembly.

Referring to FIG. 9, valve sleeve 40 includes a tubular member shaped to fit closely on the outer surface of cannula 30. Valve sleeve 40 comprises a resilient, elastomeric material that may stretch and/or compress when subjected to mechanical strain. Valve sleeve 40 includes an inner sleeve diameter substantially equal to the outer diameter of cannula 30 in some embodiments. Valve sleeve 40 comprises a vent 46 defined in the tubular wall of the sleeve. Vent 46 may take any suitable shape, including but not limited to a slit, a flap, a hole or a plurality of openings. Vent 46 allows inflation medium such as liquid or gas to enter and inflate the balloon 50.

The inflation port 36 of cannula 30 is located a first length L1 from the proximal end of cannula 30. Similarly, the vent 46 on valve sleeve 40 is located a second length L2 from the proximal end of valve sleeve 40. In some embodiments, when valve sleeve 40 is installed on cannula 30, vent 46 is purposely axially misaligned (or axially offset) with inflation port 36 such that inflation port 36 and vent 46 are not located the same axial distance from the proximal end of cannula 30. In other words, in some embodiments, L1 is greater than L2. In other embodiments, L1 is less than L2. By positioning the vent 46 at a different axial position relative to inflation port 36, valve sleeve 40 operates as a check valve that fits tight against cannula 30 thereby preventing fluid from inadvertently traveling back into second lumen 32 via inflation port 36. By varying the ratio of L1/L2, the balloon device may be "tuned" to achieve different inflation characteristics, such as required pressure for inflation. When fluid travels out of inflation port 36 toward the inner wall of valve sleeve 40, valve sleeve 40 slightly expands enough to permit the liquid or gas to travel inside a local plenum formed between valve sleeve 40 and cannula 30 and pass through vent 46 to fill the balloon 50. The positive pressure formed inside the balloon 50 upon inflation further presses valve sleeve 40 back against cannula 30, thereby maintaining the self-sealing check valve configuration.

Figure 10:
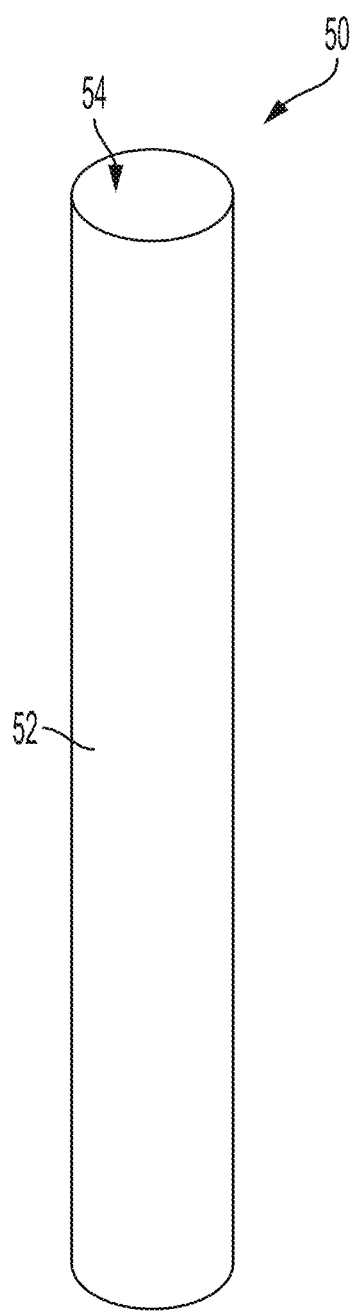
FIG. 10 illustrates a perspective view of a balloon for use with a balloon assembly.

Referring to FIG. 10, an embodiment of a balloon 50 is shown. Balloon 50 includes a body 52 comprising a resilient, elastomeric material. Balloon 50 fits closely over the outer surface of valve sleeve 40. When pressurized gas or liquid exits vent 46, balloon 50 becomes inflated. Balloon 50 may include any suitable balloon device and material known known in the art for medical applications. The wall thickness of balloon 50 may be varied along its axial profile to provide different inflation shapes, sizes or inflation parameters. For example, in some embodiments, balloon 50 includes a uniform wall thickness along its axial length. In other embodiments, balloon 50 includes a higher or lower wall thickness in the middle axial position of the balloon 50 between the opposite ends.

Figures 11A, 11B:
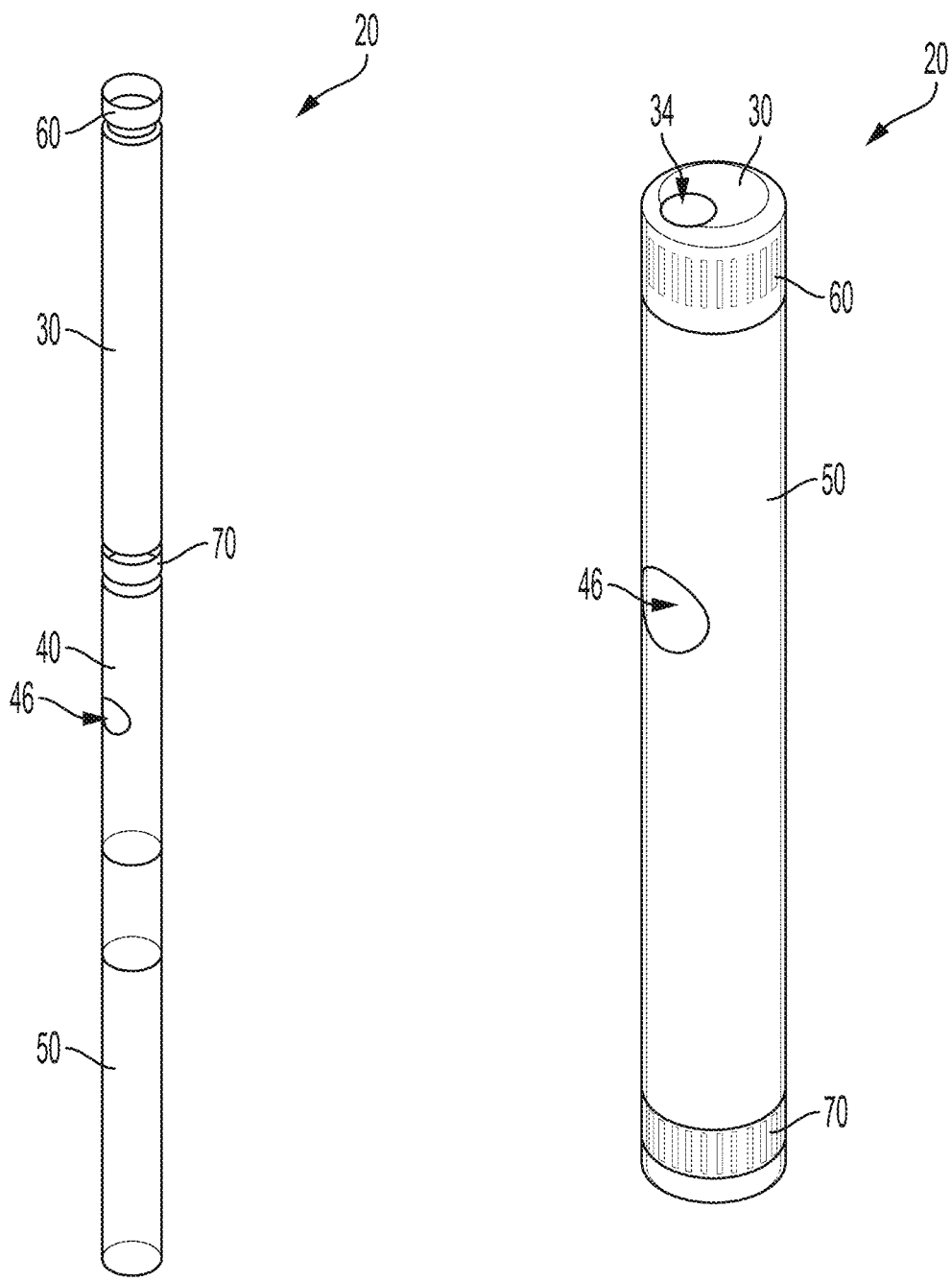
FIG. 11A illustrates an exploded perspective view of an embodiment of a detachable and inflatable balloon assembly for embolization of an aneurysm.
FIG. 11B illustrates a perspective view of an embodiment of a detachable and inflatable balloon assembly for embolization of an aneurysm.

Referring to FIG. 11A, an exploded view of an embodiment of a balloon apparatus 20 is shown. Balloon apparatus 20 includes a cannula 30, a valve sleeve 40 and a balloon 50. These three components are assembled by axially sliding the valve sleeve 40 over the cannula 30, and sliding the balloon 50 over the valve sleeve 40. The device may be assembled in any order. First and second marker bands 60, 70 are positioned external to the three main components at the proximal and distal ends of cannula 30 in some embodiments. Marker bands 60, 70 may be crimped, welded, fused or otherwise attached to the assembly to form a gas-tight seal at each end of balloon apparatus 20. As such, when fluid is introduced to the balloon apparatus 20 to fill balloon 50, the first and second marker bands 60, 70 hold tight against the components and prevent fluid from escaping at the proximal and distal ends of the device. This causes balloon 50 to inflate in a toroidal shape around cannula 30 in some embodiments, as shown in FIGS. 12 and 13.

Valve sleeve 40 and balloon 50 may be sealed against each other and against cannula 30 at proximal and distal ends of the device using other suitable fastening means in various embodiments, including but not limited to mechanical sealing, adhesives, radio-frequency (RF) welding, crimping, or using an alternative fastener such as a wire or tape. Additionally, in some embodiments, valve sleeve 40 and balloon 50 may be integrally formed as a single elastomeric two-layer piece with vent 46 defined therein. Referring to FIG. 11B, an embodiment of an assembled balloon apparatus 20 is shown including first and second marker bands 60, 70 positioned at opposite ends of the device.

Figure 12:
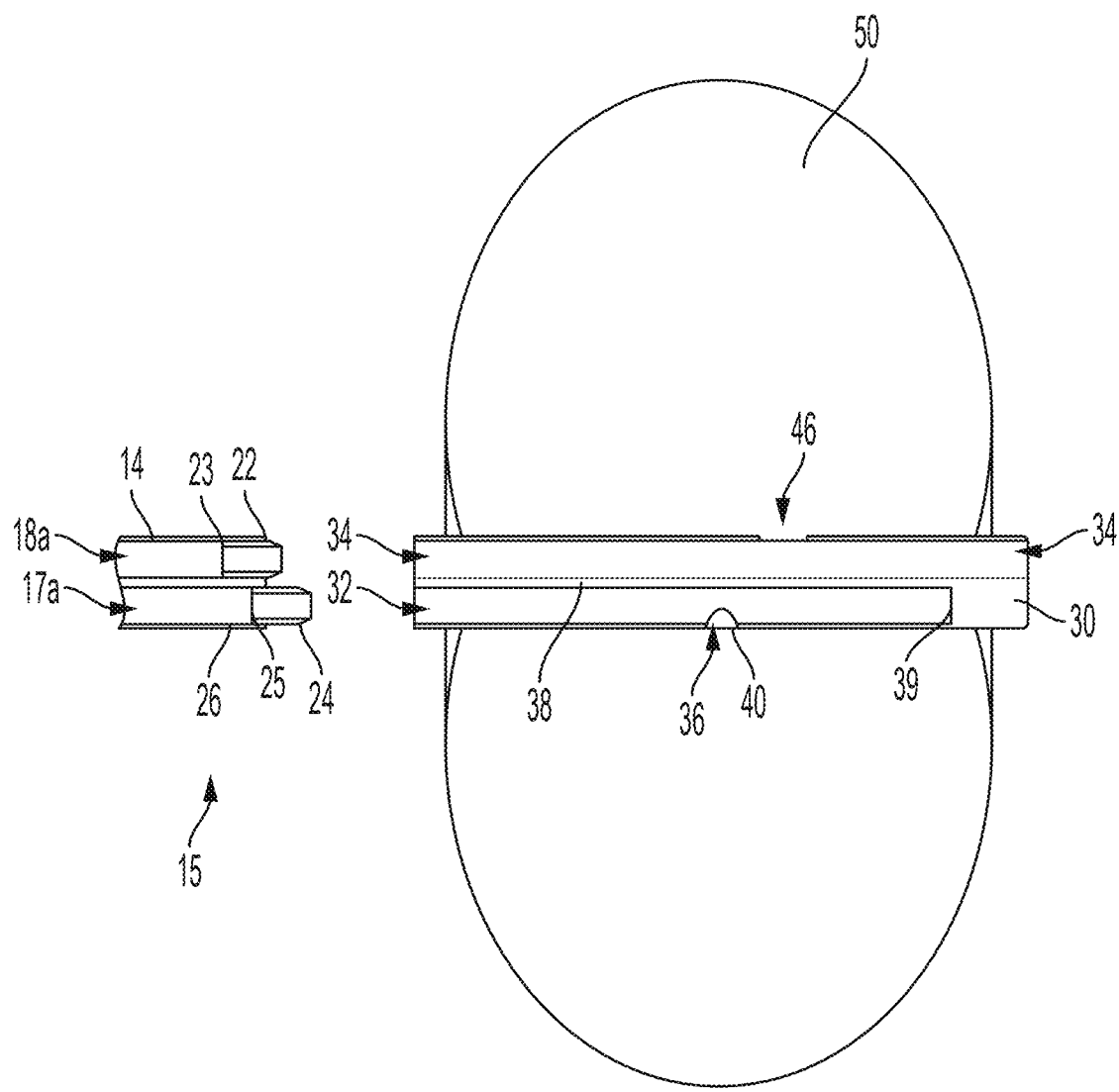
FIG. 12 illustrates a cross-sectional view of an embodiment of a balloon embolization system including a detachable balloon assembly in an inflated state detached from a catheter.
Figure 13:
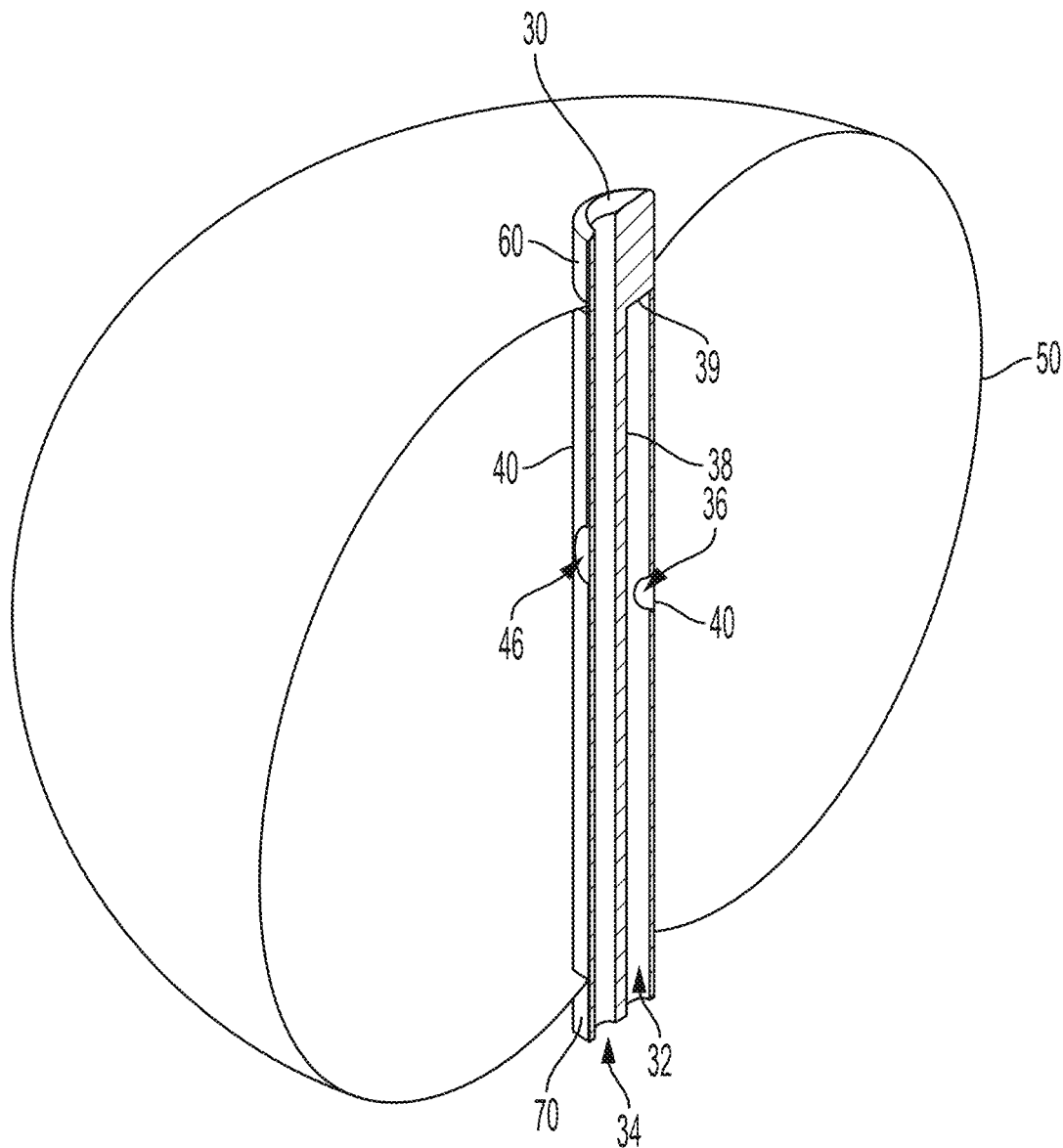
FIG. 13 illustrates a perspective view of an embodiment of a detachable balloon assembly in an inflated state.

Referring to FIG. 12, a partial cross-sectional view of an embodiment of a balloon apparatus 20 and a catheter 14 is shown. Catheter 14 includes a distal end 15 configured for a releasable attachment to balloon apparatus 20. In some embodiments, a first plug 22 is installed in a first channel 18a in catheter 14. First plug 22 includes a hollow bore and a proximal end 23 inserted into first channel 18a in a press fit. Alternatively, first plug 22 may be secured in first channel 18a using a threaded engagement, a fastener or an adhesive. In further embodiments, first plug 22 may be integrally formed or molded on catheter 14 as a unitary, one-piece construction. In some embodiments, a second plug 24 is installed in a second channel 17a in catheter 14. Second plug 24 includes a hollow bore and a proximal end 25 inserted into second channel 17a in a press fit. Alternatively, second plug 24 may be secured in second channel 17a using a threaded engagement, a fastener or an adhesive. In further embodiments, second plug 24 may be integrally formed or molded on catheter 14 as a unitary, one-piece construction.

First plug 22 is received in guide wire lumen 34 on cannula 30. First plug 22 includes a tapered distal end shaped to be inserted into guide wire lumen 34. In some embodiments, first plug 22 enters guide wire lumen 34, but does not form an interference fit. In other embodiments, first plug 22 forms an interference fit between catheter 14 and cannula 30. First plug 22 is identical to second plug 24 in some embodiments.

Second plug 24 is received in inflation lumen 32 on cannula 30. Second plug 24 includes a tapered distal end shaped to be inserted into inflation lumen 32 in a press fit. The tapered profile of second plug 24 includes an angle of about thirty degrees in some embodiments.

First and second plugs 22, 24 may be secured in place using the radially compressive force applied by marker band 26 in some embodiments.

In some embodiments, balloon 50 when inflated extends axially on its distal and proximal ends beyond cannula 30 such that the ends of cannula 30 are not exposed and do not press against tissue inside the aneurysm when the balloon 50 is inflated.

Referring to FIG. 13, in some embodiments, inflation port 36 and vent 46 are angularly offset with respect to each other. The angular offset provides additional self-sealing functionality, as the angular offset prevents backflow of fluid from the balloon 50 back into the inflation cannula 30. In some embodiments, the angular offset between inflation port 36 and vent 46 is about 180 degrees. In further embodiments, the angular offset is between zero degrees and 180 degrees. In further embodiments, inflation port 36 and vent 46 are both angularly offset and axially offset to provide enhanced self-sealing functionality. The degree of angular offset and the amount of axial offset between vent 46 and inflation port 36 are parameters that can be varied from device to device to fine tune inflation parameters such as fill rate and fill pressure.

Figure 14A:
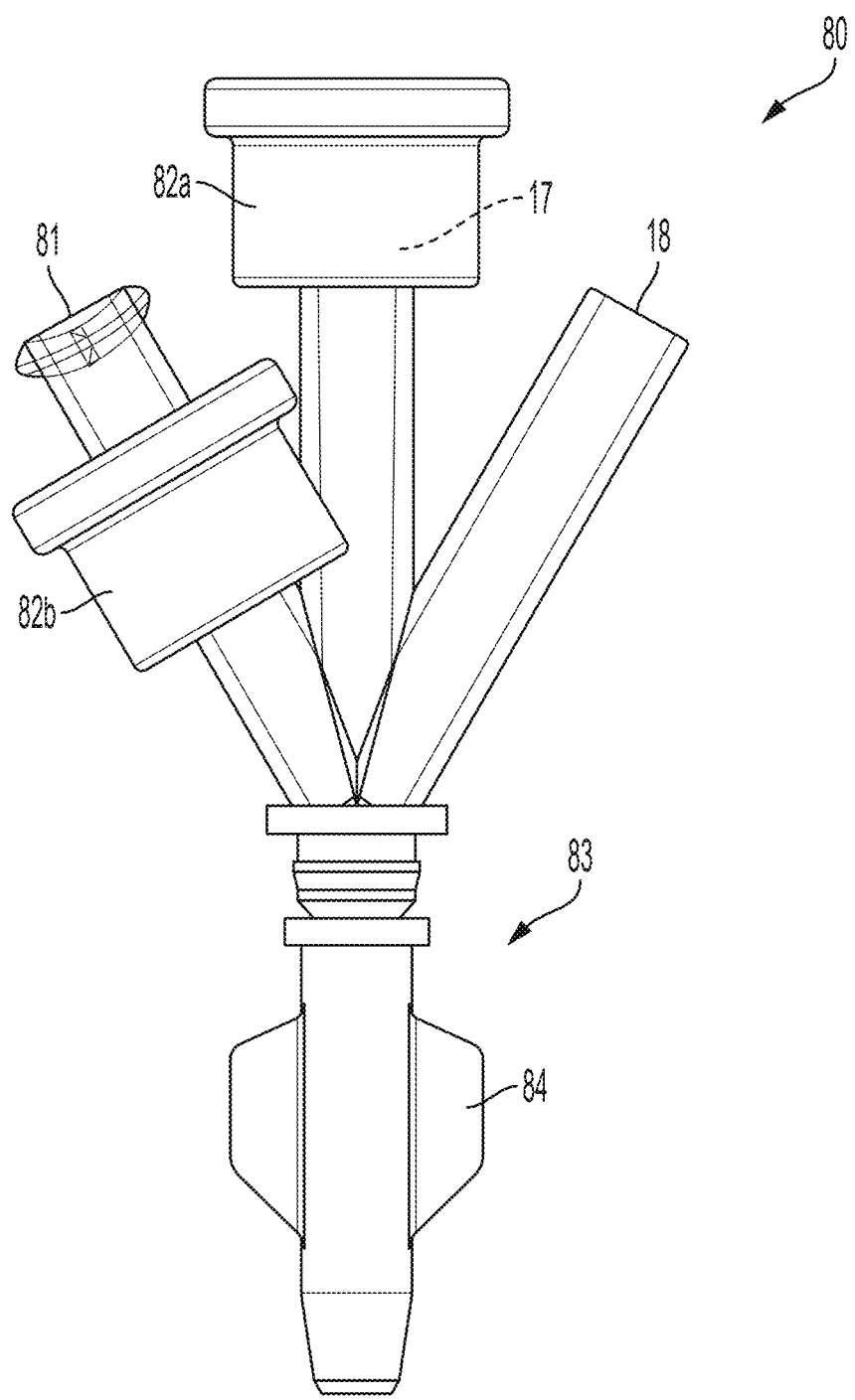
FIG. 14A illustrates a side view of an embodiment of a three-way connector and a tri-hub for use in a balloon embolization system.

FIG. 14A depicts one embodiment of a three-way connector 80. The three-way connector 80 may be used in place of the Y-connector 16 depicted in FIGS. 1-4. The three-way connector 80 may include the first channel 17 and the second channel 18, similar to the first and second channels 17, 18 of the Y-connector 16. The three-way connector 80 may include a third channel 81. In some embodiments, the three-way connector 80 may include an end cap 82a. The end cap 82a may be removably disposable on the end of a channel 17, 18, 81. The end cap 82a may prevent an object from inadvertently entering a channel 17, 18, 81. In some embodiments, the three-way connector 80 may include a wire cap 82b. The wire cap 82b may be selectively disposed on a channel 17, 18, 81. The wire cap 82b may include a wire (such as the guide wire 29 or the nitinol wire (described below)) that may be inserted into the channel 17, 18, 81.

In one embodiment, a tri-hub 83 may be disposed on an end of the three-way connector 80, as is illustrated in FIG. 14A. The tri-hub 83 may include a channel through which the catheter 14 or the cannula 30 may traverse. The tri-hub 83 may include one or more wings 84 that may extend from the main body of the tri-hub 83. A wing 84 may allow a user to grip the tri-hub 83 (or the tri-hub 83-three-way connector 80 assembly) to move or position the tri-hub 83 (or the tri-hub 83-three-way connector 80 assembly).

Figure 14B:
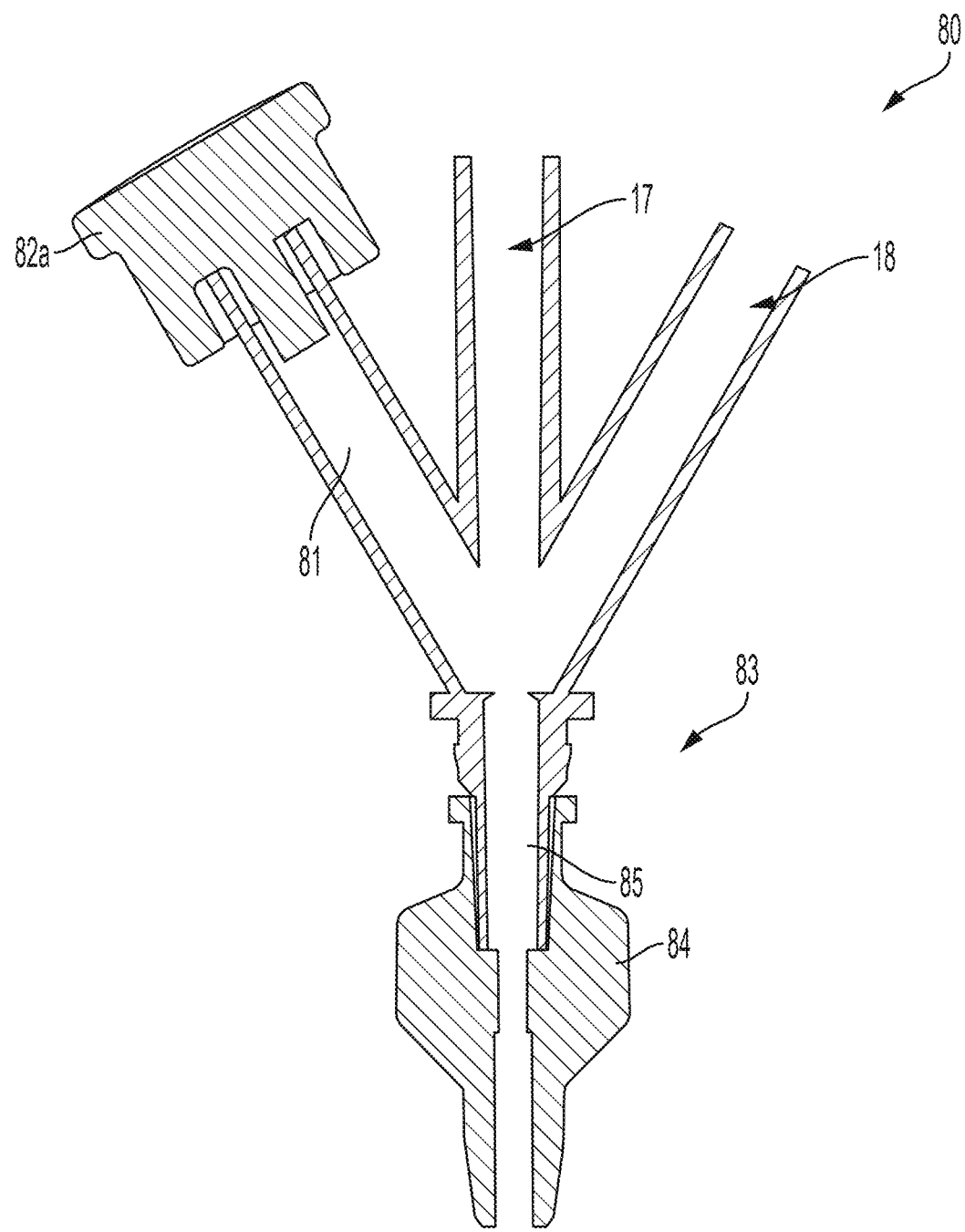
FIG. 14B illustrates a cutaway side view of an embodiment of a three-way connector and a tri-hub for use in a balloon embolization system.

FIG. 14B depicts a cutaway view of an assembly of a three-way connector 80 and a tri-hub 83. As can be seen in FIG. 14B, the first, second, and third channels 17, 18, 81 may include hollow channels by which objects, fluids, or other items may traverse through the three-way connector 80. The first, second, and third channels 17, 18, 81 may joint into a main channel 85. In one embodiment, the catheter 14 may extend through the main channel 85 and out the end of the tri-hub 83 that is disposed distal from the three-way connector 80.

Figure 15:
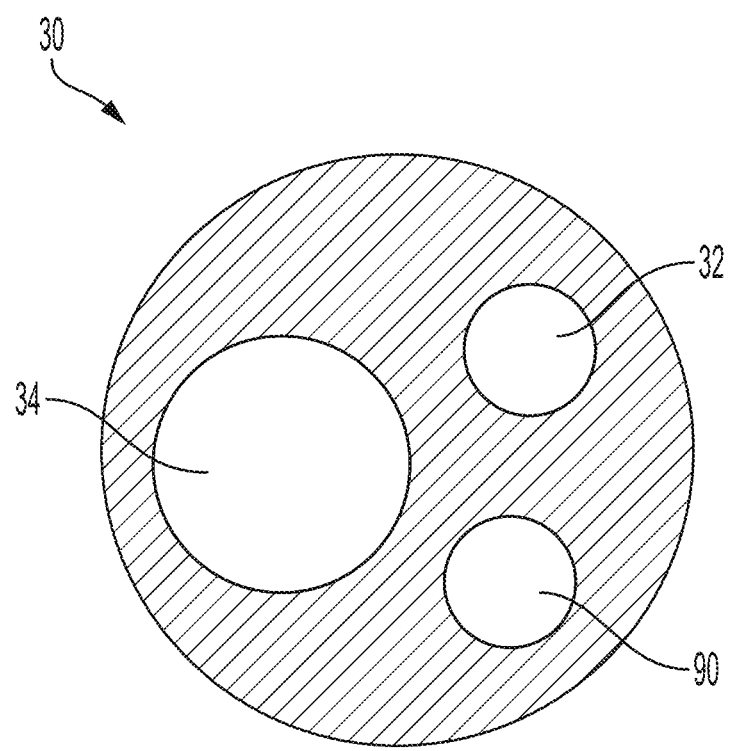
FIG. 15 illustrates a cutaway front view of an embodiment of a catheter for use with a balloon embolization system.

FIG. 15 depicts another embodiment of the cannula 30. In this embodiment, the cannula 30 may include the first lumen 34 and the second lumen 32. The first lumen 34 may include the guide wire lumen, and the second lumen 32 may include the inflation lumen. The cannula 30 may include a third lumen 90. The third lumen 90 may include a deflation lumen. In some embodiments, the catheter 14 may include the first, second, and third lumens 34, 32, 90.

Figure 16A:
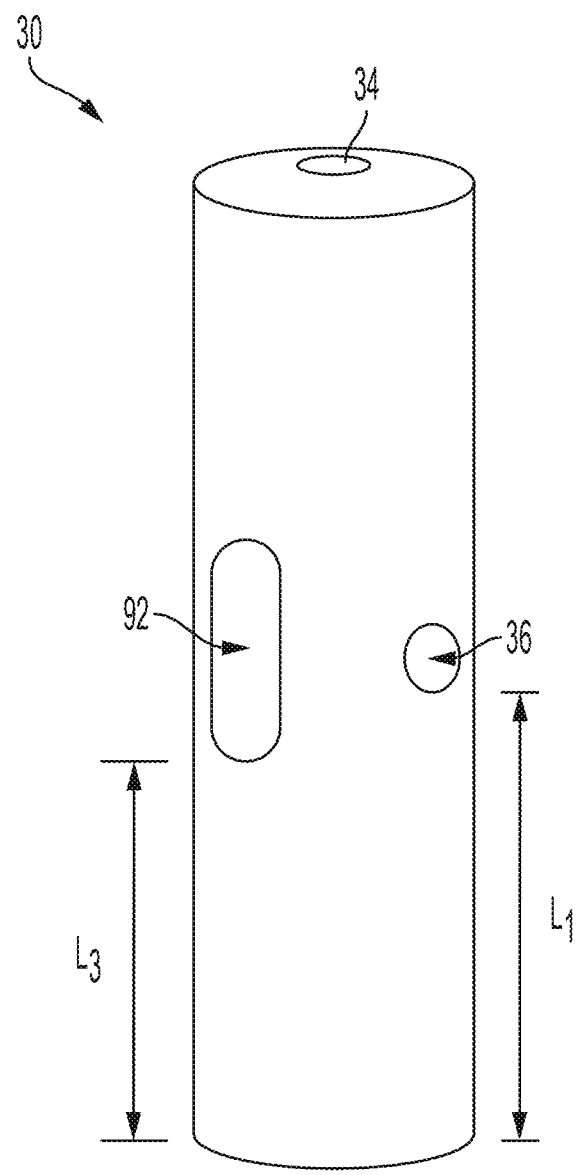
FIG. 16A illustrates a perspective side view of an embodiment of a cannula for use with a embolization system.

FIG. 16A depicts one embodiment of the cannula 30. The cannula 30 may include the first lumen 34. The cannula 30 may include the inflation port 36. The inflation port 36 may be located the first length L1 from the proximal end of cannula 30. The cannula 30 may include a deflation port 92. The deflation port 92 may be located a third length L3 from the proximal end of the cannula 30.

In some embodiments, as depicted in FIG. 16A, the deflation port 92 may include a pill shape. However, in other embodiments, the deflation port 92 may include other shapes such as an oval, circle, slit, rectangle, or other shape. In one or more embodiments, the third length L3 may be shorter than the first length L1 (as is shown in FIG. 16A). In certain embodiments, the third length L3 may be longer than the first length L1, shorter than the second length L2, or longer than the second length L2.

Figure 16B:
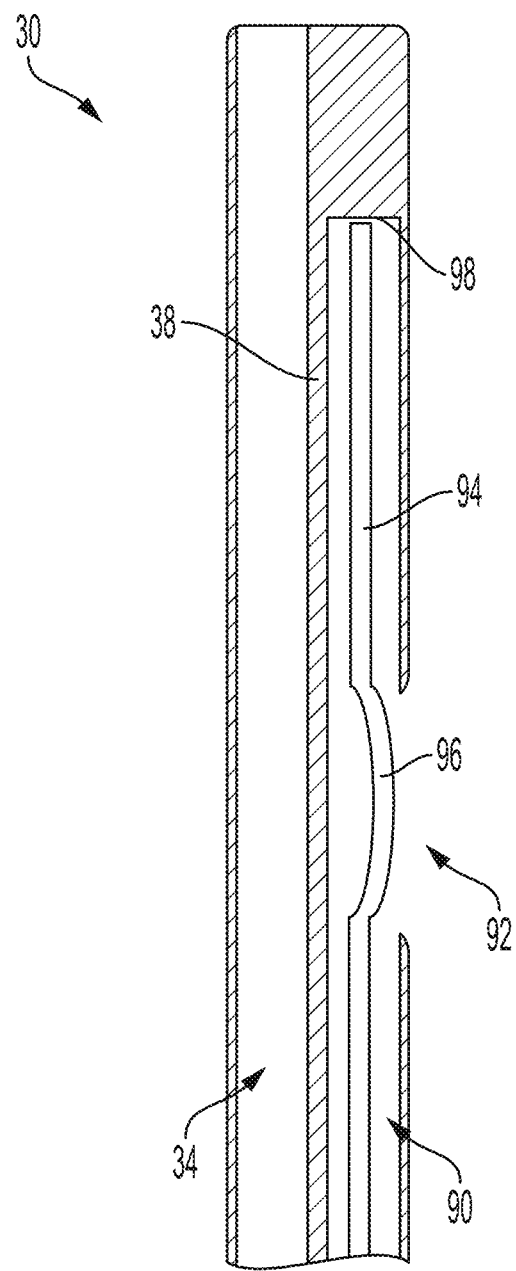
FIG. 16B illustrates a cross-sectional view of the cannula of FIG. 16A.

FIG. 16B depicts one embodiment of the cannula 30. The cannula 30 may include the first, second, and third lumens 34, 32 (not shown), and 90. The cannula 30 may include the wall 38 defined inside the cannula 30. The cannula 30 may include the deflation port 92 defined in the cannula 30. Deflation port 92 may be in fluid communication with the deflation lumen 90. Deflation port 92 may include one or more holes drilled or otherwise formed through the side wall of cannula 30. In some embodiments, the deflation port 92 may be purposely axially misaligned (or axially offset) with inflation port 36 or vent 46.

The deflation lumen 90 may include a deflation mechanism 94 disposed within the deflation lumen 90. The deflation mechanism 94 may include a wire. The wire may include a heat-seat nickel titanium (nitinol) wire. The wire may include shape memory properties. The wire may include a preformed bend 96. The preformed bend 96 may run an entire length of the wire or only a portion of the wire. The preformed bend 96 may align with the deflation port 92. In response to a transformation event, the preformed bend 96 may bend further and cause at least a portion of the deflation mechanism 94 to extend through the deflation port 92 and engage or push against the valve sleeve 40. The valve sleeve 40 may slightly expand enough to permit the fluid to travel from the inflation port 36 and pass through vent 46 to fill the balloon 50 or to permit fluid to travel from the balloon 50 through vent 46. The fluid may then travel through the deflation port 92 to deflate the balloon 50. In some embodiments the fluid may travel through the inflation port 36 to deflate the balloon 50.

In some embodiments, the transformation event may include heating or cooling the wire to a predetermined temperature, manipulating the wire (e.g., twisting the wire, pushing the wire, or some other manipulation), or some other transformation event that may cause the preformed bend 96 to extend through the deflation port 92. In response to the transformation event ceasing, the preformed bend 96 may return to its shape at rest and no longer extend through the deflation port 92. This may cause the valve sleeve 40 to fit tightly to the cannula 30 and seal the balloon 50. The valve sleeve 40 being activated, and thus opened, by the deflation mechanism 94 may enable the valve sleeve 40 to act as a failsafe such that once the balloon 50 has been inflated and the balloon apparatus 20 detached from the catheter 14, the balloon 50 may retain its shape without leakage. In some embodiments, the deflation lumen 90 may include a blind end 98. In some embodiments, the valve sleeve 40 may include a silicone embedded seal valve that may be disposed over the inflation port 36 and act as a passive one-way valve.

In one or more embodiments, the catheter 14 may include a 5 Fr catheter. The guide wire of the guide wire lumen 34 may include a 0.035 inch guidewire. In one embodiment, the balloon 50 may include a material coating or a microsurfacing that may enhance endothelial wall inflammation.

Figure 17A:
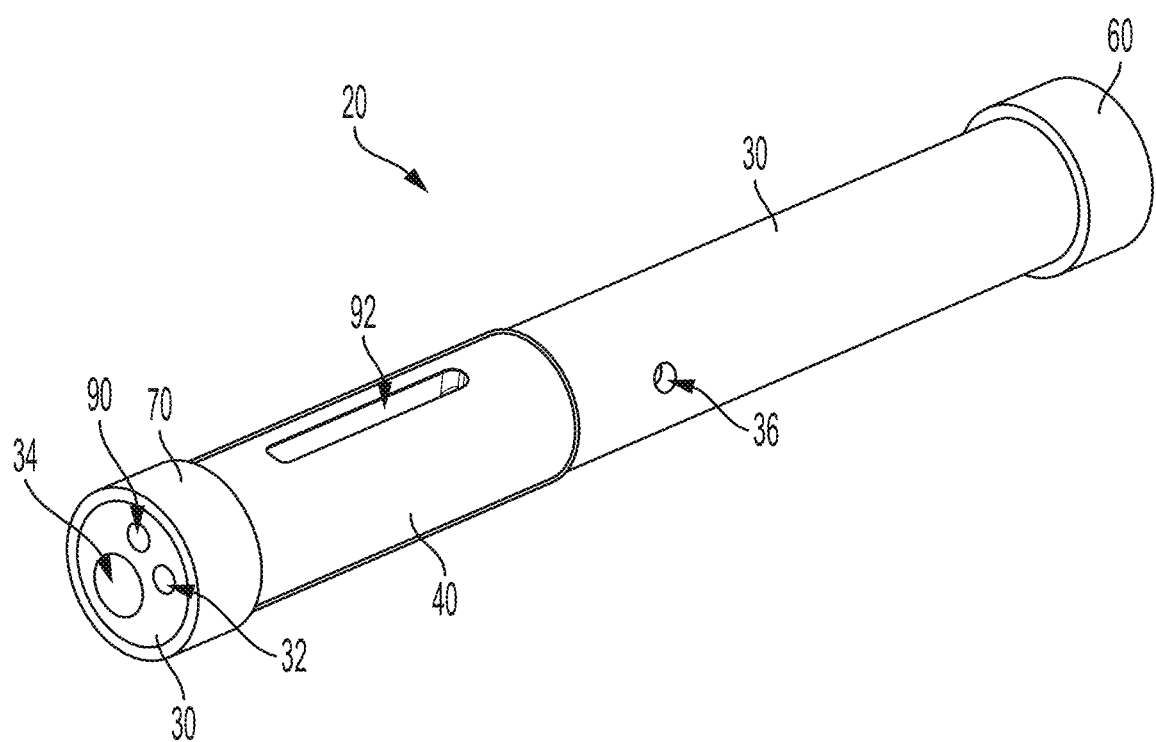
FIG. 17A illustrates a perspective view of an embodiment of a detachable and inflatable balloon assembly for embolization of an aneurysm.

FIG. 17A depicts one embodiment of a balloon apparatus 20. The balloon apparatus 20 may be similar to the balloon apparatuses 20 of FIGS. 1-13. As such, the balloon apparatus 20 may include the first marker band 60, the second marker band 70, the cannula 30, the second lumen 32, the first lumen 34, the valve sleeve 40, the vent 46 (not depicted), or the inflation port 36. In some embodiments, the balloon apparatus 20 may include the third lumen 90, the deflation port 92, or other components discussed above in relation to FIGS. 15 and 16A-B.

Figure 17B:
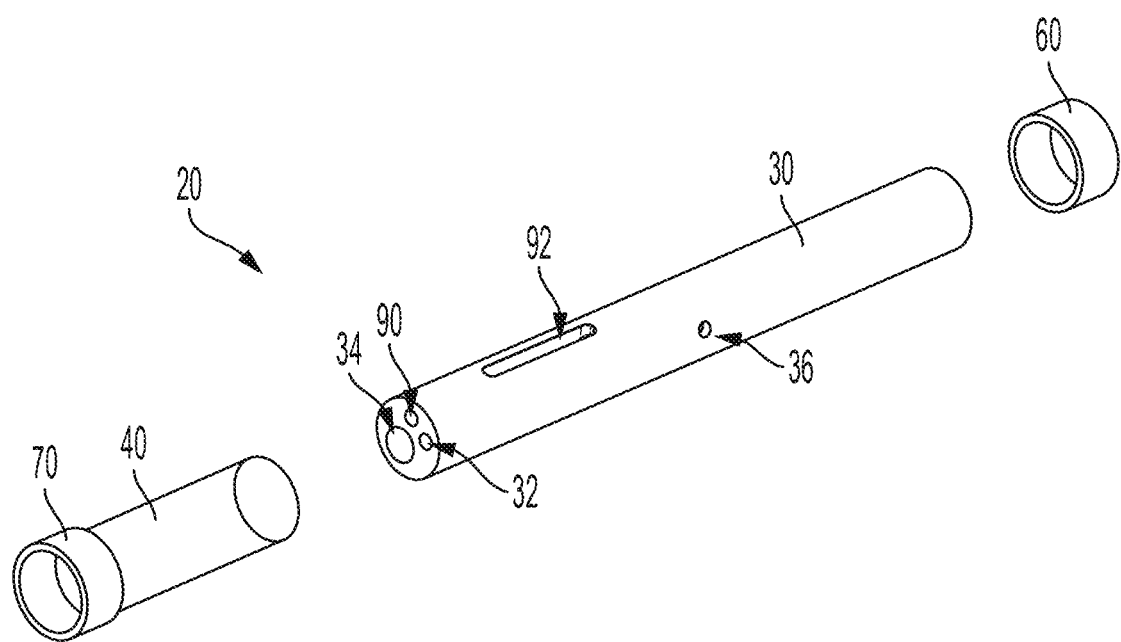
FIG. 17B illustrates an exploded view of the detachable and inflatable balloon assembly of FIG. 17A.
Figure 17C:
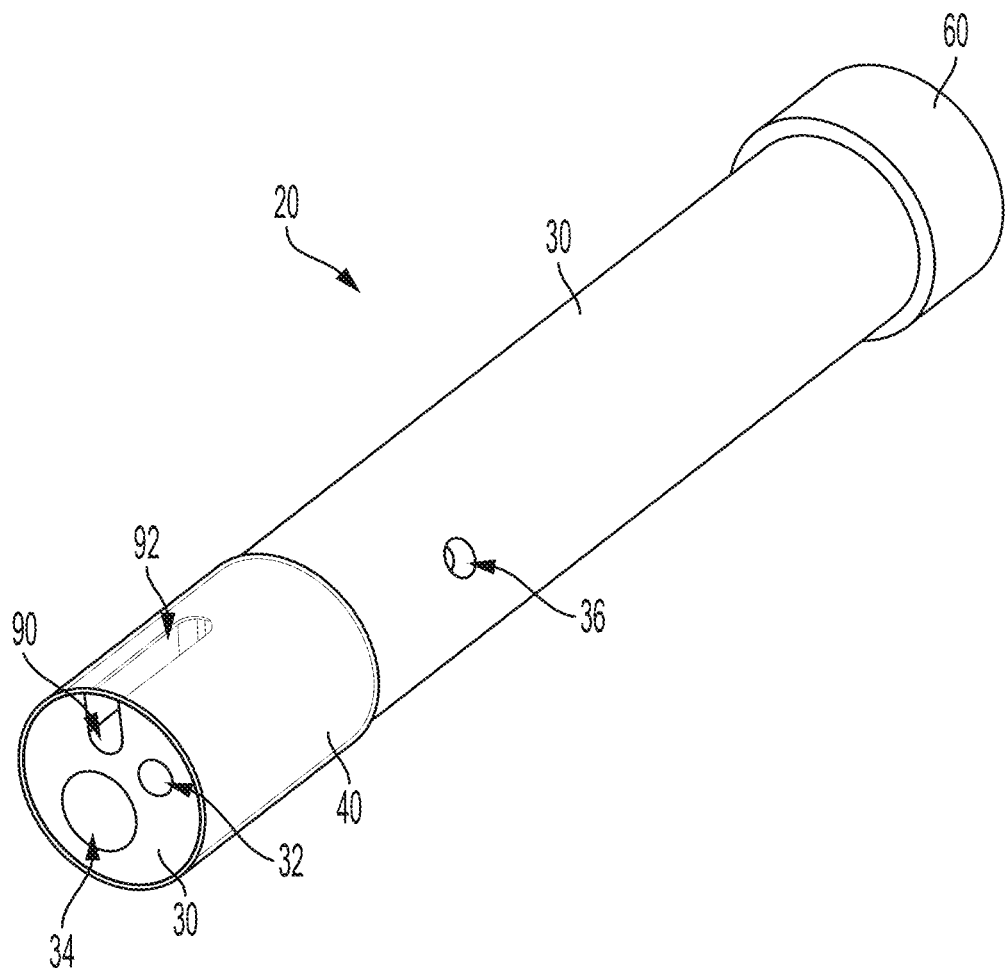
FIG. 17C illustrates a cutaway view of the detachable and inflatable balloon assembly of FIG. 17A.
Figure 18:
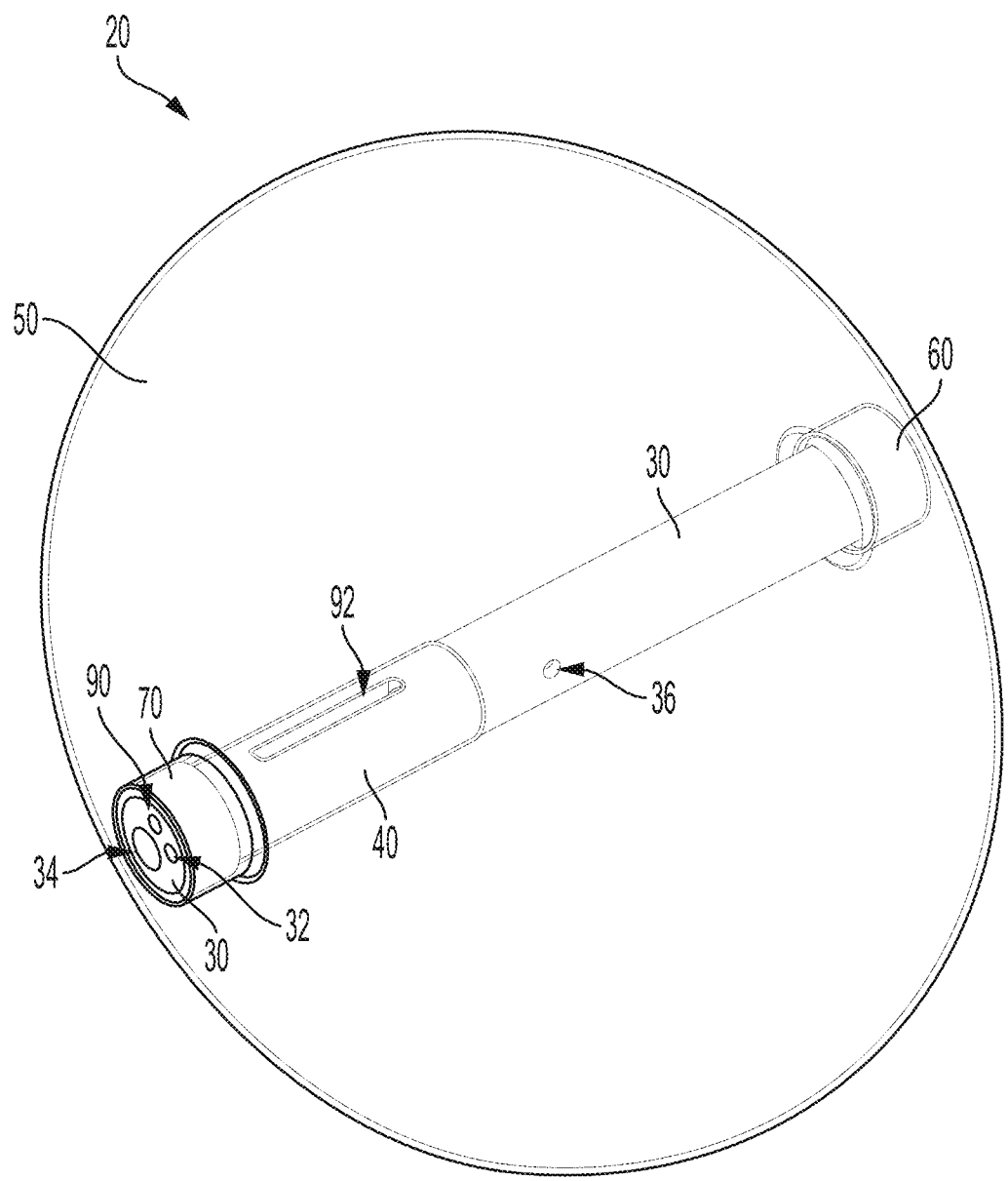
FIG. 18 illustrates a perspective view of the detachable and inflatable balloon assembly of FIG. 17A with a balloon.

FIG. 17B depicts an exploded view of the balloon apparatus 20 of FIG. 17A. FIG. 17C depicts a cutaway perspective view of the balloon apparatus 20 of FIG. 17A. As can be seen from FIG. 17C, the deflation port 92 may run along a portion of the third lumen 90. FIG. 18 depicts one embodiment of the balloon apparatus 20 of FIG. 17A with the balloon 50 inflated. In some embodiments, the balloon apparatus 20 may operate similarly to the balloon apparatus 20 described above in relation to FIGS. 1-13. However, as discussed above in relation to FIGS. 15 and 16A-B, in response to a transformation event, the deflation mechanism 94 (such as the nitinol wire) may further bend and push against the valve sleeve 40. This may allow a fluid disposed in the balloon 50 to flow through the third lumen 90 or the second lumen 32 and deflate the balloon 50.

Figure 19A:
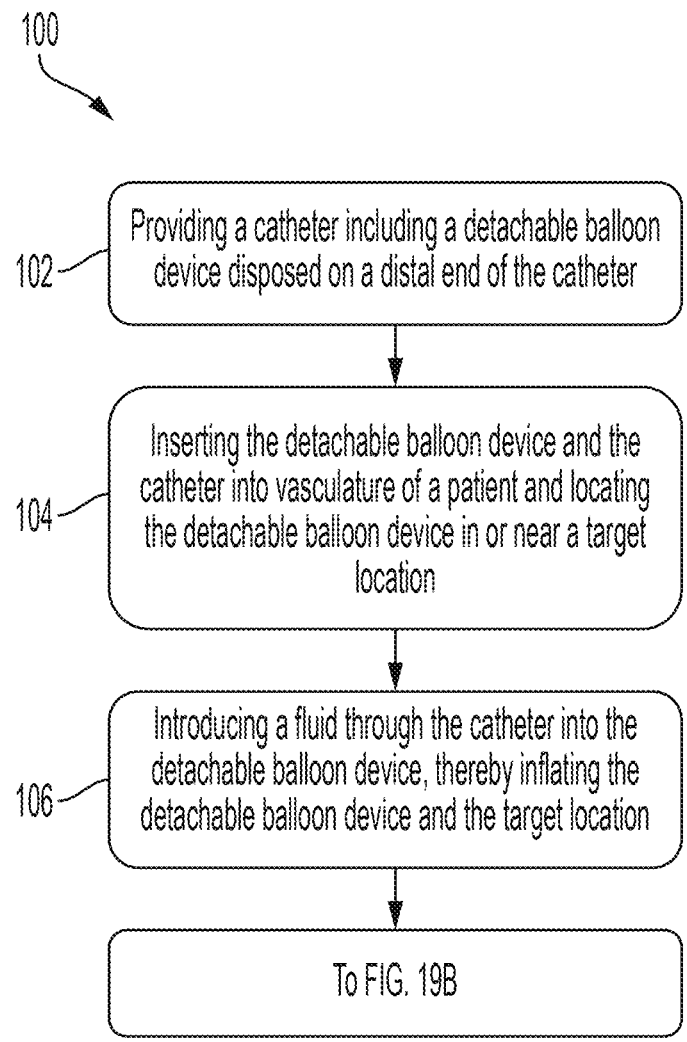
FIG. 19A illustrates a method of aneurysm embolization.
Figure 19B:
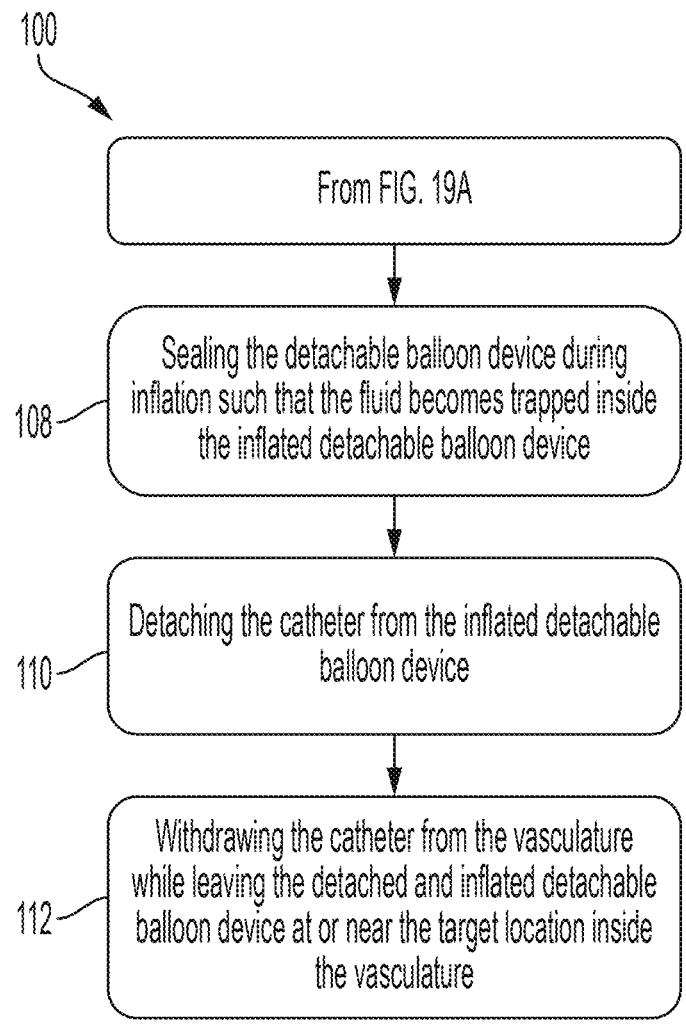
FIG. 19B illustrates a continuation of the method of FIG. 19A.

FIG. 19A and FIG. 19B depict one embodiment of a method 100. The method 100 may include a method of embolization. The method 100 may include embolization of an aneurysm or a vessel, including but not limited to arterial, venous, lymphatic, or vascular malformation embolization. The method 100 may include providing a catheter 14, including a detachable balloon device 20 disposed on a distal end 15 of the catheter 14 (step 102). The method 100 may include inserting the detachable balloon device 20 and the catheter 14 into vasculature 12 of a patient and locating the detachable balloon device 20 in or near a target location (step 104). The method 100 may include introducing a fluid through the catheter 14 into the detachable balloon device 20, thereby inflating the detachable balloon device 20 and the target location (step 106). The method 100 may include sealing the detachable balloon device 20 during inflation such that the fluid becomes trapped inside the inflated detachable balloon device 20 (step 108). The method 100 may include detaching the catheter 14 from the inflated detachable balloon device 20 (step 110). The method 100 may include withdrawing the catheter 14 from the vasculature 12 while leaving the detached and inflated detachable balloon device 20 at or near the target location inside the vasculature 12 (step 112). In some embodiments, one or more steps 102-112 of the method 100 may be performed by one or more elements of the systems and apparatuses described above and may perform as described above.

In one embodiment, the detachable balloon device 20 may include the cannula 30. The cannula 30 may include a first axial lumen 34 and a second axial lumen 32. The detachable balloon device 20 may include the balloon 50, which may include a tubular balloon disposed on the cannula 30. The detachable balloon device 20 may include the valve sleeve 40. The valve sleeve 40 may be disposed between the tubular balloon 50 and the cannula 30. The valve sleeve 40 may include a vent 46. In some embodiments, the detachable balloon device 20 may be detachably secured to the catheter 14 in a friction fit.

In certain embodiments, introducing the fluid through the catheter 14 into the detachable balloon device 20 (step 106) may include the valve sleeve 40 expanding to permit the fluid to travel inside a local plenum formed between the valve sleeve 40 and the cannula 30. Step 106 may include the fluid passing through the vent 46 into the tubular balloon 50.

In one embodiment, sealing the detachable balloon device 20 during inflation (step 108) may include forming a positive pressure inside the tubular balloon 50. The positive pressure may further press the valve sleeve 40 against the cannula 30. In some embodiments, the fluid inside the tubular balloon 50 may create the positive pressure. In one or more embodiments, introducing the fluid through the catheter 14 (step 106) may include introducing a pressurized liquid or a gas through the catheter 14.

In one embodiment, the method 100 may further include the step of manipulating a nickel titanium wire. The nickel titanium wire may be disposed in the catheter 14 and in a lumen 90 of the cannula 30. Manipulating the wire may partially deflate the inflated detachable balloon device 20 (e.g., by allowing the fluid to exit the balloon 50 through the vent 46).

In some embodiments, the systems and methods disclosed herein provide a fully compliant balloon 50 capable of conforming to the morphology of a vascular structure into which the balloon 50 is inflated. The balloon 50 (along with the balloon apparatus 20 the balloon 50 is included with) has the ability to then safely detach from the catheter 14 delivery system. The balloon 50 may take the shape of the vessel or aneurysm 10 to induce immediate, mechanical occlusion. The balloon 50 and other detachable portions of the balloon apparatus 20 can detach while the balloon 50 keeps its shape and radial strength due to the self-sealing nature of the device 20. The systems and methods may provide for inflation, deflation, and reinflation of the balloon 50 to be able to accurately position and reposition the balloon 50 within the aneurysm 10 or vessel.

Thus, although there have been described particular embodiments of the present invention of new and useful balloon embolization devices, systems and methods, it is not intended that such references be construed as limitations upon the scope of this invention except as set forth in the Claims.

What is claimed is:

1. A balloon embolization apparatus, comprising:
a cannula comprising an inflation lumen;
an inflation port defined in a sidewall of the cannula, wherein the inflation port is in fluid communication with the inflation lumen;
a balloon disposed on the cannula; and
a valve sleeve disposed between the balloon and the cannula, the valve sleeve defining a vent in fluid communication with the balloon,
wherein the vent forms a hole on the valve sleeve that is angularly and axially offset relative to the inflation port,
wherein the valve sleeve fits tightly against the cannula over the inflation port when the balloon is inflated, and
wherein the valve sleeve presses against the cannula forming a seal over the inflation port in response to a positive pressure within the inflated balloon.

2. The apparatus of claim 1, further comprising:
a first marker band disposed around the balloon, the valve sleeve, and the cannula at a first end of the cannula; and a second marker band disposed around the balloon, the valve sleeve, and the cannula at a second end of the cannula opposite the first end.

3. The apparatus of claim 2, wherein the first marker band and the second marker band each form a gas-tight seal between the balloon, the valve sleeve, and the cannula.

4. The apparatus of claim 2, wherein the first marker band and the second marker band each form a gas-tight seal between the balloon, the valve sleeve, and the cannula.

5. The apparatus of claim 1, wherein the balloon comprises an endothelial wall inflammation-enhancing material coating.

6. The apparatus of claim 1, wherein:
the cannula further includes a deflation lumen; and
the apparatus further includes a deflation port defined in the sidewall of the cannula and in fluid communication with the deflation lumen.

7. The apparatus of claim 6, further comprising a wire disposed in the deflation lumen,
wherein the wire includes a preformed bend disposed proximate the deflation port, and
wherein the preformed bend of the wire is configured to engage the valve sleeve in response to a transformation event.

8. The apparatus of claim 7, wherein the wire comprises a nickel titanium wire, and wherein the transformation event includes heating the wire to a predetermined temperature.

9. The apparatus of claim 1, further comprising a guidewire,
wherein the cannula further comprises a guide wire lumen, and
wherein the guidewire extends through the guide wire lumen.

10. A balloon embolization apparatus, comprising:
a cannula comprising a deflation lumen and an inflation lumen;
an inflation port defined in a sidewall of the cannula, wherein the inflation port is in fluid communication with the inflation lumen;
a deflation port defined in the sidewall of the cannula, wherein the deflation port is in fluid communication with the deflation lumen;
a wire disposed in the deflation lumen;
a balloon disposed on the cannula; and
a valve sleeve disposed between the balloon and the cannula, the valve sleeve defining a vent in fluid communication with the balloon,
wherein the vent forms a hole on the valve sleeve that is angularly and axially offset relative to the inflation port,
wherein the valve sleeve fits tightly against the cannula over the inflation port when the balloon is inflated, and
wherein the valve sleeve presses against the cannula forming a seal over the inflation port in response to a positive pressure within the inflated balloon.

11. The apparatus of claim 10, further comprising:
a first marker band disposed around the balloon, the valve sleeve, and the cannula at a first end of the cannula; and
a second marker band disposed around the balloon, the valve sleeve, and the cannula at a second end of the cannula opposite the first end.

12. The apparatus of claim 11, wherein the first marker band and the second marker band each form a gas-tight seal between the balloon, the valve sleeve, and the cannula.

13. The apparatus of claim 11, wherein the first marker band and the second marker band each further include a device visible under fluoroscopy.

14. The apparatus of claim 10, wherein:
the wire includes a preformed bend disposed proximate the deflation port; and
the preformed bend of the wire is configured to engage the valve sleeve in response to a transformation event.

15. The apparatus of claim 14, wherein the wire comprises a nickel titanium wire.

16. The apparatus of claim 15, wherein the transformation event includes heating the wire to a predetermined temperature.

17. A balloon embolization apparatus, comprising:
a cannula comprising an inflation lumen;
an inflation port defined in a sidewall of the cannula, wherein the inflation port is in fluid communication with the inflation lumen;
a balloon disposed on the cannula; and
a valve sleeve disposed between the balloon and the cannula, the valve sleeve defining a vent in fluid communication with the balloon,
wherein the vent forms a hole on the valve sleeve that is angularly and axially offset relative to the inflation port,
wherein the vent is axially offset relative to the inflation port by an axial distance relative to a center axis of the cannula,
wherein the valve sleeve includes a silicone embedded seal valve disposed over the inflation port, and
wherein the valve sleeve fits tightly against the cannula over the inflation port, sealing the balloon when the balloon is inflated.

18. The apparatus of claim 17, further comprising:
a first marker band disposed around the balloon, the valve sleeve, and the cannula at a first end of the cannula; and
a second marker band disposed around the balloon, the valve sleeve, and the cannula at a second end of the cannula opposite the first end.

19. The apparatus of claim 18, wherein the first marker band and the second marker band each form a gas-tight seal between the balloon, the valve sleeve, and the cannula.

20. The apparatus of claim 17, wherein the cannula further includes a deflation lumen, the apparatus further comprising:
a deflation port defined in the sidewall of the cannula and in fluid communication with the deflation lumen; and
a wire disposed in the deflation lumen, wherein the wire includes a preformed bend disposed proximate the deflation port.

* * * * *